United States Patent
Lin et al.

(10) Patent No.: US 10,185,125 B2
(45) Date of Patent: Jan. 22, 2019

(54) PHOTOGRAPHING OPTICAL LENS SYSTEM, IMAGE CAPTURING UNIT AND ELECTRONIC DEVICE

(71) Applicant: LARGAN Precision Co., Ltd., Taichung (TW)

(72) Inventors: Cheng-Chen Lin, Taichung (TW); Chun-Yen Chen, Taichung (TW); Yu-Tai Tseng, Taichung (TW); Hung-Shuo Chen, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/470,502

(22) Filed: Mar. 27, 2017

(65) Prior Publication Data
US 2018/0164552 A1    Jun. 14, 2018

(30) Foreign Application Priority Data
Dec. 9, 2016 (TW) .............................. 105140801 A

(51) Int. Cl.
G02B 13/00 (2006.01)
G02B 9/60 (2006.01)
G02B 5/20 (2006.01)

(52) U.S. Cl.
CPC ......... *G02B 13/0045* (2013.01); *G02B 5/208* (2013.01); *G02B 9/60* (2013.01)

(58) Field of Classification Search
CPC .. G02B 13/0045; G02B 9/60; G02B 13/0055; G02B 9/62; G02B 9/64; G02B 5/208
See application file for complete search history.

(56) References Cited

U.S. PATENT DOCUMENTS

| 8,908,288 B2 | 12/2014 | Hsu et al. |
| 9,250,420 B2 | 2/2016 | Hsu et al. |

(Continued)

FOREIGN PATENT DOCUMENTS

| TW | 201224571 | 6/2012 |
| TW | 201303411 | 1/2013 |

(Continued)

OTHER PUBLICATIONS

Taiwan Patent Office, "Notice of Allowance," issued in connection with Taiwanese Patent Application No. 05140801, dated Jun. 1, 2017, 7 pages (4 pages of original Notice of Allowance, 3 pages of English machine translation).

*Primary Examiner* — Jordan Schwartz
(74) *Attorney, Agent, or Firm* — Hanley, Flight & Zimmerman, LLC

(57) ABSTRACT

A photographing optical lens system includes five lens elements which are, in order from an object side to an image side, a first lens element, a second lens element, a third lens element, a fourth lens element and a fifth lens element. The second lens element has positive refractive power. The third lens element has negative refractive power. The fourth lens element has positive refractive power. The fifth lens element with negative refractive power has an image-side surface being concave in a paraxial region thereof, wherein the image-side surface thereof has at least one convex critical point in an off-axial region thereof, the object-side surface and the image-side surface thereof are aspheric.

28 Claims, 29 Drawing Sheets

(56) References Cited

U.S. PATENT DOCUMENTS

| | | |
|---|---|---|
| 2013/0050848 A1 | 2/2013 | Lee |
| 2015/0103241 A1 | 4/2015 | Lin et al. |
| 2015/0103243 A1 | 4/2015 | Lin et al. |
| 2016/0131899 A1* | 5/2016 | Jo .................... G02B 5/005 348/294 |
| 2016/0195693 A1 | 7/2016 | Tang et al. |
| 2016/0282589 A1* | 9/2016 | Chen ............ G02B 13/0045 |
| 2016/0356990 A1 | 12/2016 | Liu et al. |
| 2016/0356991 A1 | 12/2016 | Liu et al. |
| 2017/0045718 A1* | 2/2017 | Park, II ............... G02B 9/62 |
| 2017/0168268 A1* | 6/2017 | Tang ............ G02B 13/0045 |
| 2018/0045913 A1* | 2/2018 | Hsueh ........... G02B 13/0045 |

FOREIGN PATENT DOCUMENTS

| | | |
|---|---|---|
| TW | 201339632 | 10/2013 |
| WO | 2016003211 | 1/2016 |

* cited by examiner

PHOTOGRAPHING OPTICAL LENS SYSTEM, IMAGE CAPTURING UNIT AND ELECTRONIC DEVICE

RELATED APPLICATIONS

This application claims priority to Taiwan Application 105140801, filed Dec. 9, 2016, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, the compact optical systems have gradually evolved toward the field of higher megapixels. Since there is an increasing demand for the electronic devices featuring compactness and better imaging functionality, the compact optical systems featuring high image quality has become the mainstream product in the market.

With the development and the popularity of smart electronic products, the need for better imaging functionality is now more demanding than ever. For example, users may want to take a wide-angle selfie, a scenic photo having large depth of field and so on. Thus, some smart electronic products are equipped with an optical lens system featuring large field of view, large aperture and high resolution. However, due to the requirement of compactness, the optical lens system of the electronic product should simultaneously meet the requirements of compact size, large aperture and large field of view, along with an image sensor having higher image resolution.

With the image sensor increasing in image resolution and the size of the optical system stayed compact, pixel size of the image sensor needs to be reduced. However, a smaller pixel size is more sensitive to chromatic aberration and astigmatism so that the optical lens system would require better capability of correcting chromatic aberration to satisfy a higher standard of imaging needs.

Thus, there is a need to develop an optical system featuring compact size, large aperture, large field of view and good capability of correcting chromatic aberrations, simultaneously.

SUMMARY

According to one aspect of the present disclosure, a photographing optical lens system includes five lens elements which are, in order from an object side to an image side, a first lens element, a second lens element, a third lens element, a fourth lens element and a fifth lens element. The second lens element has positive refractive power. The third lens element has negative refractive power. The fourth lens element has positive refractive power. The fifth lens element with negative refractive power has an image-side surface being concave in a paraxial region thereof, wherein the image-side surface of the fifth lens element has at least one convex critical point in an off-axial region thereof, and an object-side surface and the image-side surface of the fifth lens element are both aspheric. When an Abbe number of the first lens element is V1, an Abbe number of the second lens element is V2, an Abbe number of the third lens element is V3, an Abbe number of the fourth lens element is V4, an Abbe number of the fifth lens element is V5, a focal length of the second lens element is f2, a focal length of the third lens element is f3, and the following conditions are satisfied:

$30<(V1+V2)-(V3+V4+V5)<75$; and $-1.75<f2/f3<0$.

According to another aspect of the present disclosure, an image capturing unit includes the aforementioned photographing optical lens system and an image sensor, wherein the image sensor is disposed on an image surface of the photographing optical lens system.

According to still another aspect of the present disclosure, an electronic device includes the aforementioned image capturing unit.

According to yet still another aspect of the present disclosure, a photographing optical lens system includes five lens elements which are, in order from an object side to an image side, a first lens element, a second lens element, a third lens element, a fourth lens element and a fifth lens element. The second lens element has positive refractive power. The third lens element has negative refractive power. The fourth lens element has positive refractive power. The fifth lens element with negative refractive power has an object-side surface being convex in a paraxial region thereof and an image-side surface being concave in a paraxial region thereof, wherein the image-side surface of the fifth lens element has at least one convex critical point in an off-axial region thereof, and the object-side surface and the image-side surface of the fifth lens element are both aspheric. When an Abbe number of the third lens element is V3, an Abbe number of the fourth lens element is V4, an Abbe number of the fifth lens element is V5, a focal length of the second lens element is f2, a focal length of the third lens element is f3, and the following conditions are satisfied:

$30<V3+V4+V5<85$; and $-1.75<f2/f3<0$.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens system includes five lens elements. The five lens elements are, in order from an object side to an image side, a first lens element, a second lens element, a third lens element, a fourth lens element and a fifth lens element.

The first lens element can have positive refractive power and an object-side surface being convex in a paraxial region thereof. Therefore, it is favorable for providing sufficient positive refractive power and reducing a total track length of the photographing optical lens system.

The second lens element with positive refractive power can have an object-side surface being concave in a paraxial region thereof and an image-side surface being convex in a paraxial region thereof. Therefore, it is favorable for balancing the positive refractive power distribution between the first lens element and the second lens element so as to reduce sensitivity of the photographing optical lens system; furthermore, it is favorable for correcting aberrations generated due to larger field of view.

Figure 25:
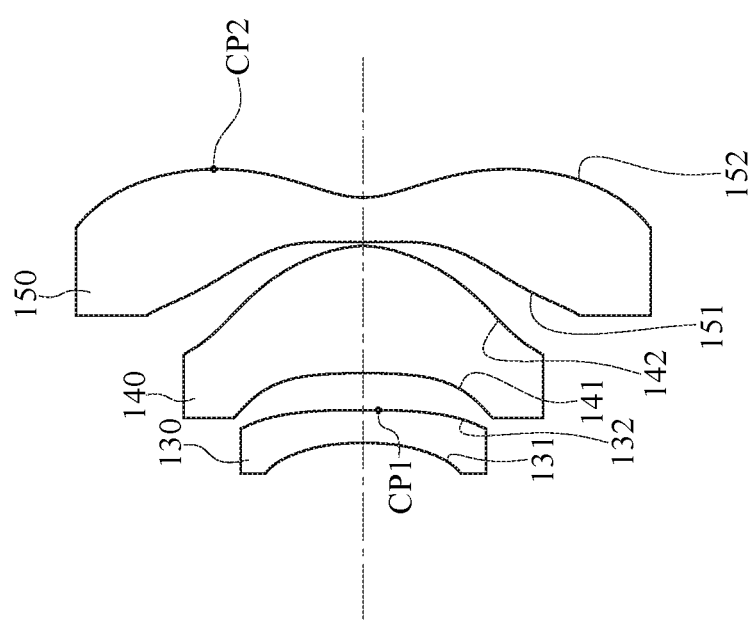
FIG. 25 is a schematic view of convex critical points on an image-side surface of the third lens element and an image-side surface of the fifth lens element, according to the 1st embodiment of the present disclosure.

The third lens element with negative refractive power can have at least one convex critical point in an off-axial region of an image-side surface. Therefore, it is favorable for correcting off-axial aberrations generated by the first lens element and the second lens element. As shown in FIG. 25, in the 1st embodiment of the present disclosure, the image-side surface of the third lens element has at least one convex critical point CP1.

The fourth lens element with positive refractive power can have an object-side surface being concave in a paraxial region thereof and an image-side surface being convex in a paraxial region thereof. Therefore, it is favorable for reducing a back focal length of the photographing optical lens system and obtaining a proper shape of the object-side surface of the fourth lens element so as to correct spherical aberration, thereby being favorable for light convergence.

The fifth lens element has negative refractive power. Therefore, the refractive power distribution among the first through the fifth lens elements is favorable for distributing substantial positive refractive power toward the image surface so as to enlarge the field of view. The fifth lens element can have an object-side surface being convex in a paraxial region thereof, and the fifth lens element has an image-side surface being concave in a paraxial region thereof, wherein the image-side surface of the fifth lens element has at least one convex critical point in an off-axial region thereof; therefore, a shape of the surface of the fifth lens element is favorable for reducing the incident angle of the light projecting onto the image sensor so as to improve the image-sensing efficiency of the image sensor and correct off-axial aberrations. As shown in FIG. 25, in the 1st embodiment of the present disclosure, the image-side surface of the fifth lens element has at least one convex critical point CP2 in an off-axial region thereof.

When a focal length of the second lens element is f2, a focal length of the third lens element is f3, the following condition is satisfied: $-1.75 < f2/f3 < 0$. Therefore, it is favorable for enhancing the refractive power of the second lens element in coordination with the refractive power of the third lens element, so that the refractive power of each lens element being overly high is prevented, thereby further improving the capability of correcting chromatic aberration. Preferably, the following condition can also be satisfied: $-1.50 < f2/f3 < -0.40$. More preferably, the following condition can also be satisfied: $-1.50 < f2/f3 < -0.50$.

When an Abbe number of the first lens element is V1, an Abbe number of the second lens element is V2, an Abbe number of the third lens element is V3, an Abbe number of the fourth lens element is V4, an Abbe number of the fifth lens element is V5, the following condition can be satisfied: $30 < (V1+V2)-(V3+V4+V5) < 75$. Therefore, it is favorable for improving the capability of correcting chromatic aberration in high resolution imaging.

When the Abbe number of the third lens element is V3, the Abbe number of the fourth lens element is V4, the Abbe number of the fifth lens element is V5, the following condition can be satisfied: $30 < V3+V4+V5 < 85$. Therefore, it is favorable for further improving the capability of correcting chromatic aberration while obtaining a balance between better capability of correcting chromatic aberration and large field of view.

When a central thickness of the second lens element is CT2, a central thickness of the third lens element is CT3, the following condition can be satisfied: $CT3/CT2 < 1.0$. Therefore, it is favorable for preventing the central thickness of the third lens element from being overly large so as to reduce molding problems due to poor lens structure.

When an arithmetic mean of refractive indices of the first lens element and the second lens element is Nv12, an arithmetic mean of refractive indices of the third lens element, the fourth lens element and the fifth lens element is Nv345, the following condition can be satisfied: $-0.30 < Nv12-Nv345 < -0.05$. Therefore, it is favorable for reducing sizes of the third lens element, the fourth lens element and the fifth lens elements so as to keep the photographing optical lens system compact. The value of Nv12 is calculated as follows: Nv12=[(the refractive index of the first lens element)+(the refractive index of the second lens element)]/2; the value of Nv345 is calculated as follows: Nv345=[(the refractive index of the third lens element)+(the refractive index of the fourth lens element)+(the refractive index of the fifth lens element)]/3.

When a focal length of the photographing optical lens system is f, a focal length of the fourth lens element is f4, a focal length of the fifth lens element is f5, the following condition can be satisfied: $3.0 < (f/f4)+|f/f5|$. Therefore, it is favorable for the light converging on the image surface while reducing the total track length and the back focal length of the photographing optical lens system so as to maintain compactness thereof.

When the Abbe number of the fourth lens element is V4, the following condition can be satisfied: $10 < V4 < 35$. Therefore, it is favorable for enhancing the capability of correcting chromatic aberration so as to improve image quality.

When a curvature radius of the object-side surface of the second lens element is R3, a curvature radius of the image-side surface of the second lens element is R4, the following condition can be satisfied: $0 \leq (R3+R4)/(R3-R4) < 2.0$. Therefore, the shape of the second lens element is favorable for correcting aberrations generated by the first lens element, and for properly arranging the axial distances between each adjacent lens element to avoid assembling problems.

When a curvature radius of an object-side surface of the third lens element is R5, a curvature radius of the image-side surface of the third lens element is R6, the following condition can be satisfied: $-2.50 \leq (R5+R6)/(R5-R6) < 0.40$. Therefore, the peripheral shape of the third lens element is favorable for light rays at the off-axial region being projected onto the image surface so as to enlarge the field of view; furthermore, it is favorable for reducing surface reflections by the surface design of lesser curvature variation at the off-axial region. Preferably, the following condition can also be satisfied: $-1.50 < (R5+R6)/(R5-R6) < 0$.

When an axial distance between the first lens element and the second lens element is T12, an axial distance between the second lens element and the third lens element is T23, the following condition can be satisfied: $2.0 < T12/T23$. Therefore, it is favorable for the space arrangement of the first lens element and the second lens element so as to increase assembling yield rate.

When a focal length of the first lens element is f1, the focal length of the second lens element is f2, the following condition can be satisfied: $0.60 < f1/f2 < 3.0$. Therefore, it is favorable for preventing both the refractive power of the first lens element and the second lens element from being overly strong so as to reduce sensitivity of the lens element related to lens decentering and tilt, thereby increasing yield rate.

When the focal length of the photographing optical lens system is f, a maximum image height of the photographing optical lens system (half of a diagonal length of an effective photosensitive area of an image sensor) is ImgH, the following condition can be satisfied: $0.85 \leq ImgH/f < 2.0$. Therefore, it is favorable for obtaining a wider field of view.

According to the present disclosure, the lens elements of the photographing optical lens system can be made of glass or plastic material. When the lens elements are made of glass material, the refractive power distribution of the photographing optical lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing optical lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens system on a corresponding image sensor can be flat or curved, particularly a concave curved surface facing towards the object side of the photographing optical lens system.

According to the present disclosure, the photographing optical lens system can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1:
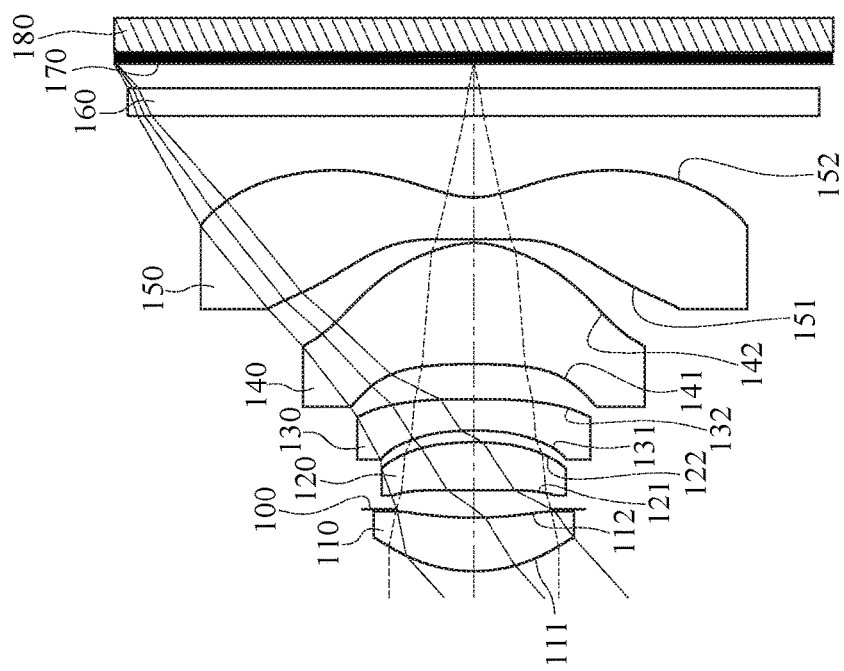
FIG. 1 is a schematic view of an image capturing unit according to the 1st embodiment of the present disclosure.
Figure 2:
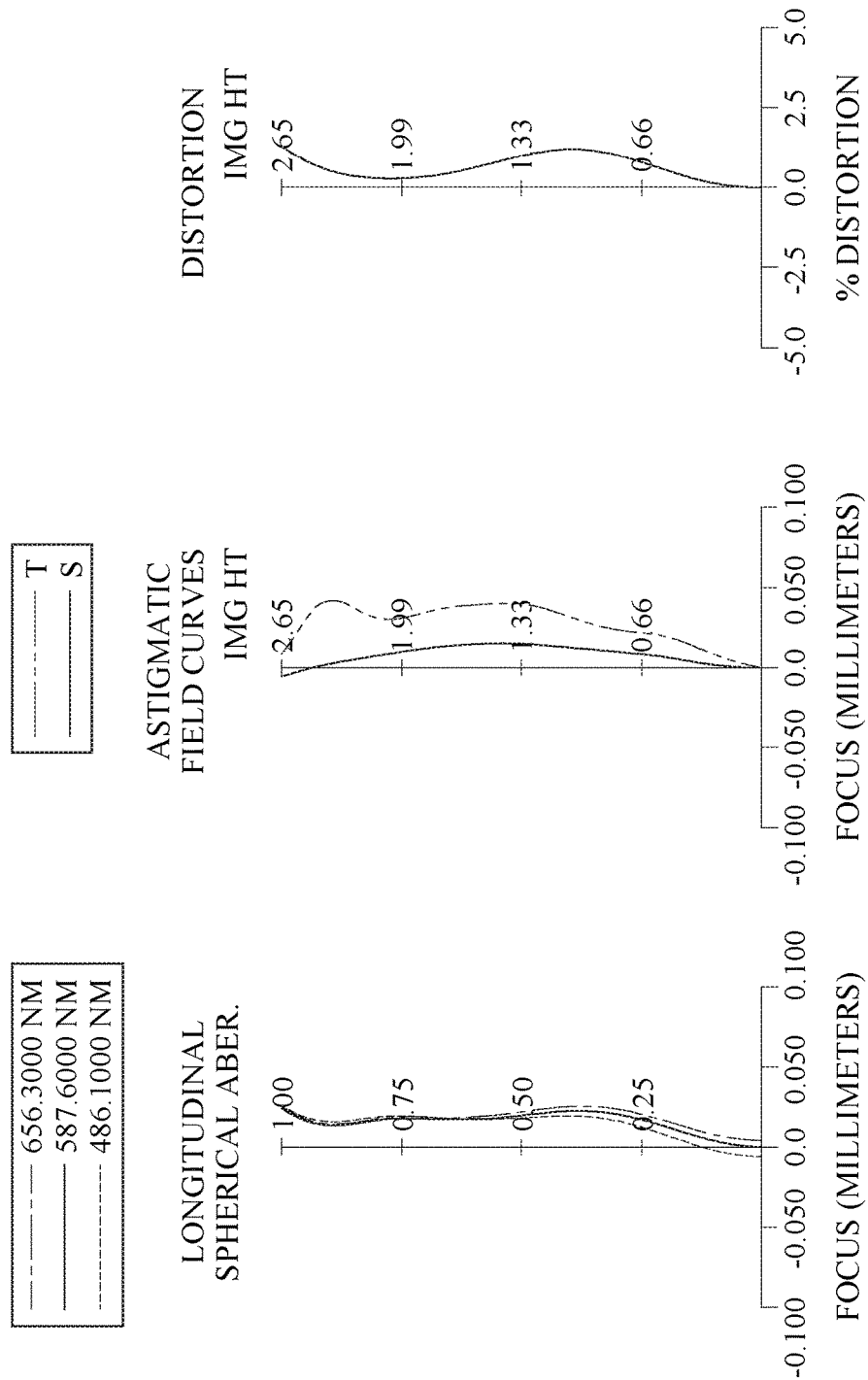
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 180. The photographing optical lens system includes five lens elements which are, in order from an object side to an image side, a first lens element 110, an aperture stop 100, a second lens element 120, a third lens element 130, a fourth lens element 140, a fifth lens element 150, an IR-cut filter 160 and an image surface 170. The photographing optical lens system includes five lens elements (110, 120, 130, 140, 150) with no additional lens element disposed between the first lens element 110 and the fifth lens element 150.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has at least one convex critical point in an off-axial region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axial region thereof.

The IR-cut filter 160 is made of glass material and located between the fifth lens element 150 and the image surface 170, and will not affect the focal length of the photographing optical lens system. The image sensor 180 is disposed on or near the image surface 170 of the photographing optical lens system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=2.89 millimeters (mm); Fno=2.30; and HFOV=42.0 degrees (deg.).

When an arithmetic mean of refractive indices of the first lens element 110 and the second lens element 120 is Nv12, an arithmetic mean of refractive indices of the third lens element 130, the fourth lens element 140 and the fifth lens element 150 is Nv345, the following condition is satisfied: Nv12−Nv345=−0.09.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, the following condition is satisfied: (V1+V2)−(V3+V4+V5)=40.3.

When the Abbe number of the third lens element 130 is V3, the Abbe number of the fourth lens element 140 is V4, the Abbe number of the fifth lens element 150 is V5, the following condition is satisfied: V3+V4+V5=71.50.

When the Abbe number of the fourth lens element 140 is V4, the following condition is satisfied: V4=26.0.

When an axial distance between the first lens element 110 and the second lens element 120 is T12, an axial distance between the second lens element 120 and the third lens element 130 is T23, the following condition is satisfied: T12/T23=2.44.

When a central thickness of the second lens element 120 is CT2, a central thickness of the third lens element 130 is CT3, the following condition is satisfied: CT3/CT2=0.65.

When the focal length of the photographing optical lens system is f, a maximum image height of the photographing optical lens system is ImgH, the following condition is satisfied: ImgH/f=0.92.

When a curvature radius of the object-side surface 121 of the second lens element 120 is R3, a curvature radius of the image-side surface 122 of the second lens element 120 is R4, the following condition is satisfied: (R3+R4)/(R3−R4)=0.96.

When a curvature radius of the object-side surface 131 of the third lens element 130 is R5, a curvature radius of the image-side surface 132 of the third lens element 130 is R6, the following condition is satisfied: (R5+R6)/(R5−R6)= −0.92.

When a focal length of the first lens element 110 is f1, a focal length of the second lens element 120 is f2, the following condition is satisfied: f1/f2=0.80.

When the focal length of the second lens element 120 is f2, a focal length of the third lens element 130 is f3, the following condition is satisfied: f2/f3=−1.13.

When the focal length of the photographing optical lens system is f, a focal length of the fourth lens element 140 is f4, a focal length of the fifth lens element 150 is f5, the following condition is satisfied: (f/f4)+|f/f5|=5.28.

The detailed optical data of the 1st embodiment are shown in Table 1 and the aspheric surface data are shown in Table 2 below.

2nd Embodiment

Figure 3:
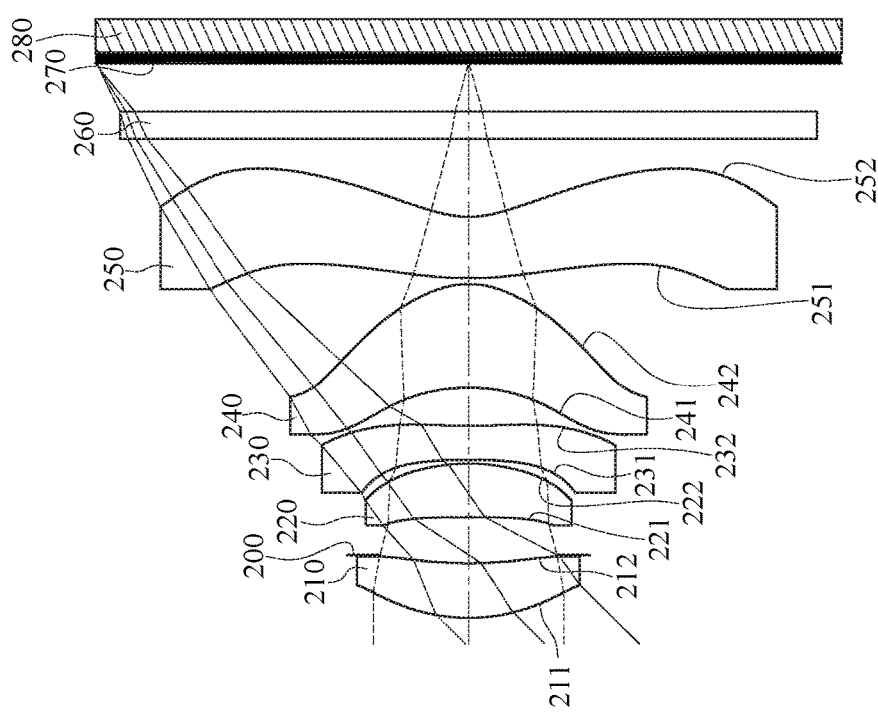
FIG. 3 is a schematic view of an image capturing unit according to the 2nd embodiment of the present disclosure.
Figure 4:
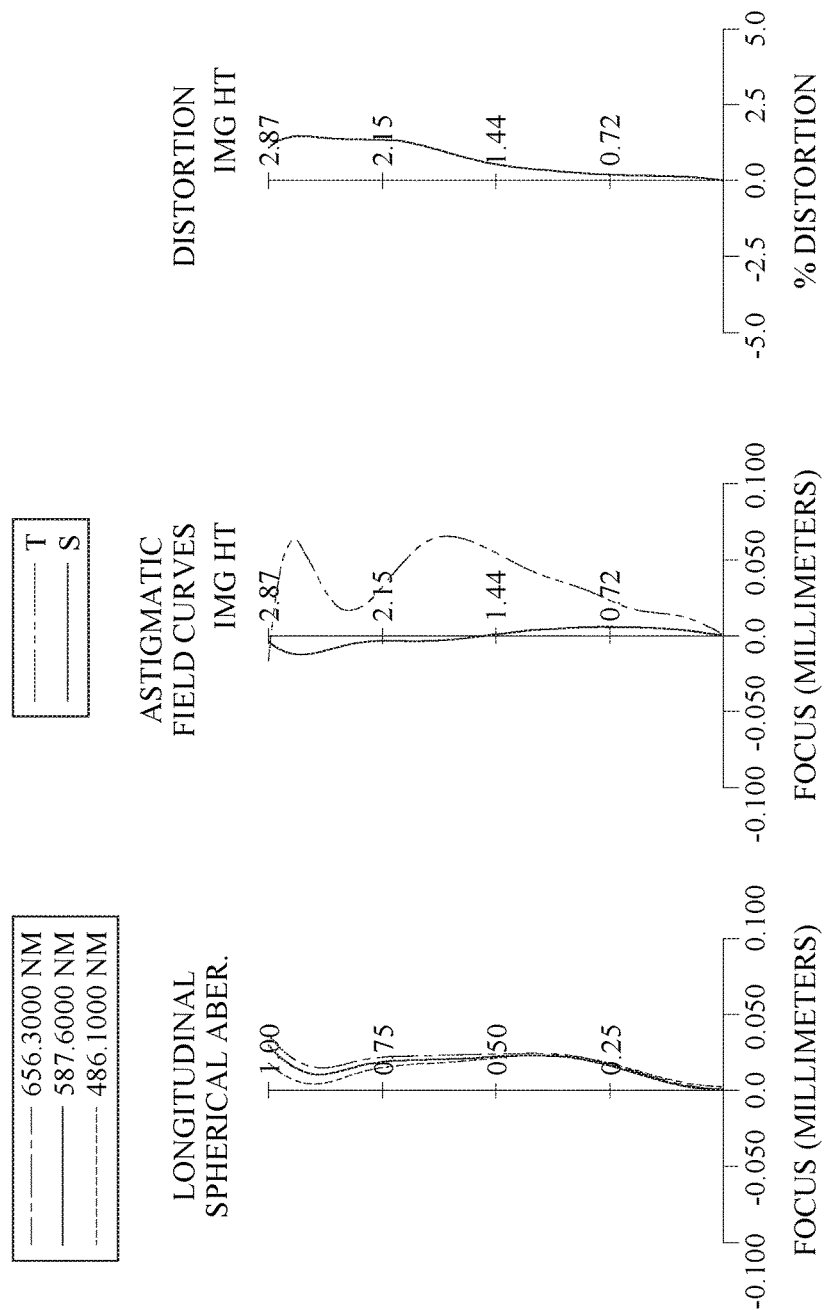
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 280. The photographing optical lens system includes five lens elements which are, in order from an object side to an image side, a first lens element 210, an aperture stop 200, a second lens element 220, a third lens element 230, a fourth lens element 240, a fifth lens element 250, an IR-cut filter 260 and an image surface 270. The photographing optical lens system includes five lens elements (210, 220, 230, 240, 250) with no additional lens element disposed between the first lens element 210 and the fifth lens element 250.

TABLE 1

1st Embodiment
f = 2.89 mm, Fno = 2.30, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.149 | (ASP) | 0.395 | Plastic | 1.544 | 55.9 | 3.31 |
| 2 | | 2.796 | (ASP) | 0.063 | | | | |
| 3 | Ape. Stop | Plano | | 0.147 | | | | |
| 4 | Lens 2 | 100.000 | (ASP) | 0.352 | Plastic | 1.544 | 55.9 | 4.14 |
| 5 | | −2.300 | (ASP) | 0.086 | | | | |
| 6 | Lens 3 | −2.573 | (ASP) | 0.230 | Plastic | 1.671 | 19.5 | −3.67 |
| 7 | | 59.992 | (ASP) | 0.261 | | | | |
| 8 | Lens 4 | −5.828 | (ASP) | 0.894 | Plastic | 1.614 | 26.0 | 1.17 |
| 9 | | −0.678 | (ASP) | 0.030 | | | | |
| 10 | Lens 5 | 13.263 | (ASP) | 0.311 | Plastic | 1.614 | 26.0 | −1.03 |
| 11 | | 0.597 | (ASP) | 0.600 | | | | |
| 12 | IR-cut filter | Plano | | 0.210 | Glass | 1.517 | 64.2 | — |
| 13 | | Plano | | 0.179 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 4 | 5 | 6 |
| k = | 5.9764E−01 | −2.8496E+00 | 1.6261E+01 | 1.3038E+00 | 1.2090E+01 |
| A4 = | −7.8237E−02 | −1.6112E−02 | −2.3763E−01 | −6.9002E−01 | −1.0531E+00 |
| A6 = | 2.7393E−01 | −2.1375E−01 | 4.9292E−01 | 1.5076E+00 | 3.4547E+00 |
| A8 = | −1.7651E+00 | 4.1203E−01 | −7.4640E+00 | −1.5598E+00 | −4.1067E+00 |
| A10 = | 4.0926E+00 | −2.3094E+00 | 3.6093E+01 | −1.8592E+00 | −2.1311E+00 |
| A12 = | −4.7871E+00 | 1.8909E+00 | −8.8696E+01 | 2.4695E+00 | 7.0217E+00 |
| A14 = | 7.4303E−01 | — | 8.4238E+01 | — | −3.7791E+00 |

| | Surface # | | | | |
|---|---|---|---|---|---|
| | 7 | 8 | 9 | 10 | 11 |
| k = | −3.6637E+01 | −5.9003E+01 | −5.5102E+00 | 3.8591E+01 | −5.8795E+00 |
| A4 = | −7.3084E−01 | −3.0066E−01 | −2.5263E−01 | −4.6549E−01 | −2.9468E−01 |
| A6 = | 2.0152E+00 | 4.0055E−02 | −3.5510E−01 | −2.1437E−01 | 2.4713E−01 |
| A8 = | −3.5976E+00 | −1.3519E+00 | 1.2277E+00 | 9.1709E−01 | −1.4143E−01 |
| A10 = | 4.2254E+00 | 3.2777E+00 | −1.9959E+00 | −8.0362E−01 | 5.3563E−02 |
| A12 = | −4.2013E+00 | −2.2355E+00 | 1.8499E+00 | 3.3953E−01 | −1.2868E−02 |
| A14 = | 2.3075E+00 | −1.5163E+00 | −8.4376E−01 | −7.2035E−02 | 1.7549E−03 |
| A16 = | — | 1.8559E+00 | 1.4660E−01 | 6.0997E−03 | −1.0328E−04 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one convex critical point in an off-axial region thereof.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex critical point in an off-axial region thereof.

The IR-cut filter 260 is made of glass material and located between the fifth lens element 250 and the image surface 270, and will not affect the focal length of the photographing optical lens system. The image sensor 280 is disposed on or near the image surface 270 of the photographing optical lens system.

The detailed optical data of the 2nd embodiment are shown in Table 3 and the aspheric surface data are shown in Table 4 below.

TABLE 3

2nd Embodiment
f = 2.79 mm, Fno = 1.90, HFOV = 45.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.453 | (ASP) | 0.421 | Plastic | 1.544 | 55.9 | 4.35 |
| 2 | | 3.383 | (ASP) | 0.063 | | | | |
| 3 | Ape. Stop | Plano | | 0.293 | | | | |
| 4 | Lens 2 | −9.040 | (ASP) | 0.411 | Plastic | 1.545 | 55.8 | 3.28 |
| 5 | | −1.518 | (ASP) | 0.030 | | | | |
| 6 | Lens 3 | −4.714 | (ASP) | 0.262 | Plastic | 1.666 | 20.3 | −3.65 |
| 7 | | 5.121 | (ASP) | 0.294 | | | | |
| 8 | Lens 4 | −1.436 | (ASP) | 0.803 | Plastic | 1.583 | 33.9 | 1.46 |
| 9 | | −0.646 | (ASP) | 0.045 | | | | |
| 10 | Lens 5 | 2.726 | (ASP) | 0.473 | Plastic | 1.666 | 20.3 | −1.68 |
| 11 | | 0.739 | (ASP) | 0.600 | | | | |
| 12 | IR-cut filter | Plano | | 0.210 | Glass | 1.517 | 64.2 | — |
| 13 | | Plano | | 0.377 | | | | |
| 14 | Image | Plano | | — | | | | |

Note:
Reference wavelength is 587.6 nm (d-line).
An effective radius of the object-side surface 231 (Surface 6) is 0.825 mm.

TABLE 4

Aspheric Coefficients

| | Surface # | | | | |
|---|---|---|---|---|---|
| | 1 | 2 | 4 | 5 | 6 |
| k = | 1.3032E+00 | 2.8390E+00 | 3.3246E+01 | −1.3686E+00 | −2.1118E−07 |
| A4 = | −7.7683E−02 | −1.4474E−02 | −1.0508E−01 | 5.6712E−02 | −2.2038E−01 |
| A6 = | 1.7487E−01 | −1.8893E−01 | 8.8849E−02 | −4.2557E−01 | −2.3411E−01 |
| A8 = | −8.3210E−01 | 4.7105E−01 | −2.2145E+00 | −8.0623E−01 | 4.4694E−01 |
| A10 = | 1.2989E+00 | −1.3185E+00 | 7.6515E+00 | 3.7285E+00 | −1.6875E+00 |
| A12 = | −1.0281E+00 | 9.0984E−01 | −1.4671E+01 | −6.0078E+00 | 2.5385E+00 |
| A14 = | — | — | 1.0526E+01 | 3.4977E+00 | −1.6241E+00 |

| | Surface # | | | | |
|---|---|---|---|---|---|
| | 7 | 8 | 9 | 10 | 11 |
| k = | −1.3198E+00 | −1.5706E+00 | −3.3728E+00 | 1.8167E−01 | −5.9731E+00 |
| A4 = | −3.4940E−01 | −1.7756E−01 | −3.6857E−01 | −1.2055E−01 | −6.5307E−02 |
| A6 = | 4.3078E−01 | 1.8759E−01 | 4.1893E−01 | 2.9267E−02 | 2.4930E−02 |

TABLE 4-continued

| Aspheric Coefficients | | | | | |
|---|---|---|---|---|---|
| A8 = | −5.8952E−01 | −6.1428E−01 | −5.0954E−01 | 7.3063E−03 | −6.0372E−03 |
| A10 = | 4.9317E−01 | 1.6451E+00 | 3.9113E−01 | −1.0051E−02 | 4.9086E−04 |
| A12 = | −1.9439E−01 | −1.6793E+00 | −1.2788E−01 | 3.1507E−03 | 2.7248E−05 |
| A14 = | 2.4528E−02 | 7.5883E−01 | 1.3603E−02 | −4.0195E−04 | −5.2317E−06 |
| A16 = | — | −1.3029E−01 | — | 1.7653E−05 | 1.2993E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.79 | CT3/CT2 | 0.64 |
| Fno | 1.90 | ImgH/f | 1.03 |
| HFOV [deg.] | 45.3 | (R3 + R4)/(R3 − R4) | 1.40 |
| Nv12 − Nv345 | −0.09 | (R5 + R6)/(R5 − R6) | −0.04 |
| (V1 + V2) − (V3 + V4 + V5) | 37.0 | f1/f2 | 1.33 |
| V3 + V4 + V5 | 73.00 | f2/f3 | −0.90 |
| V4 | 33.0 | (f/f4) + |f/f5| | 3.57 |
| T12/T23 | 11.87 | — | — |

3rd Embodiment

Figure 5:
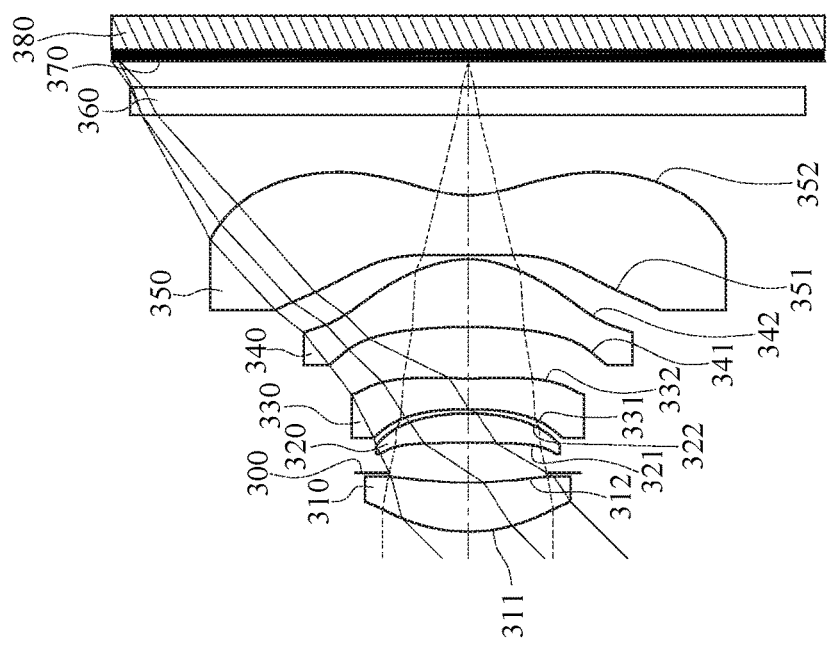
FIG. 5 is a schematic view of an image capturing unit according to the 3rd embodiment of the present disclosure.
Figure 6:
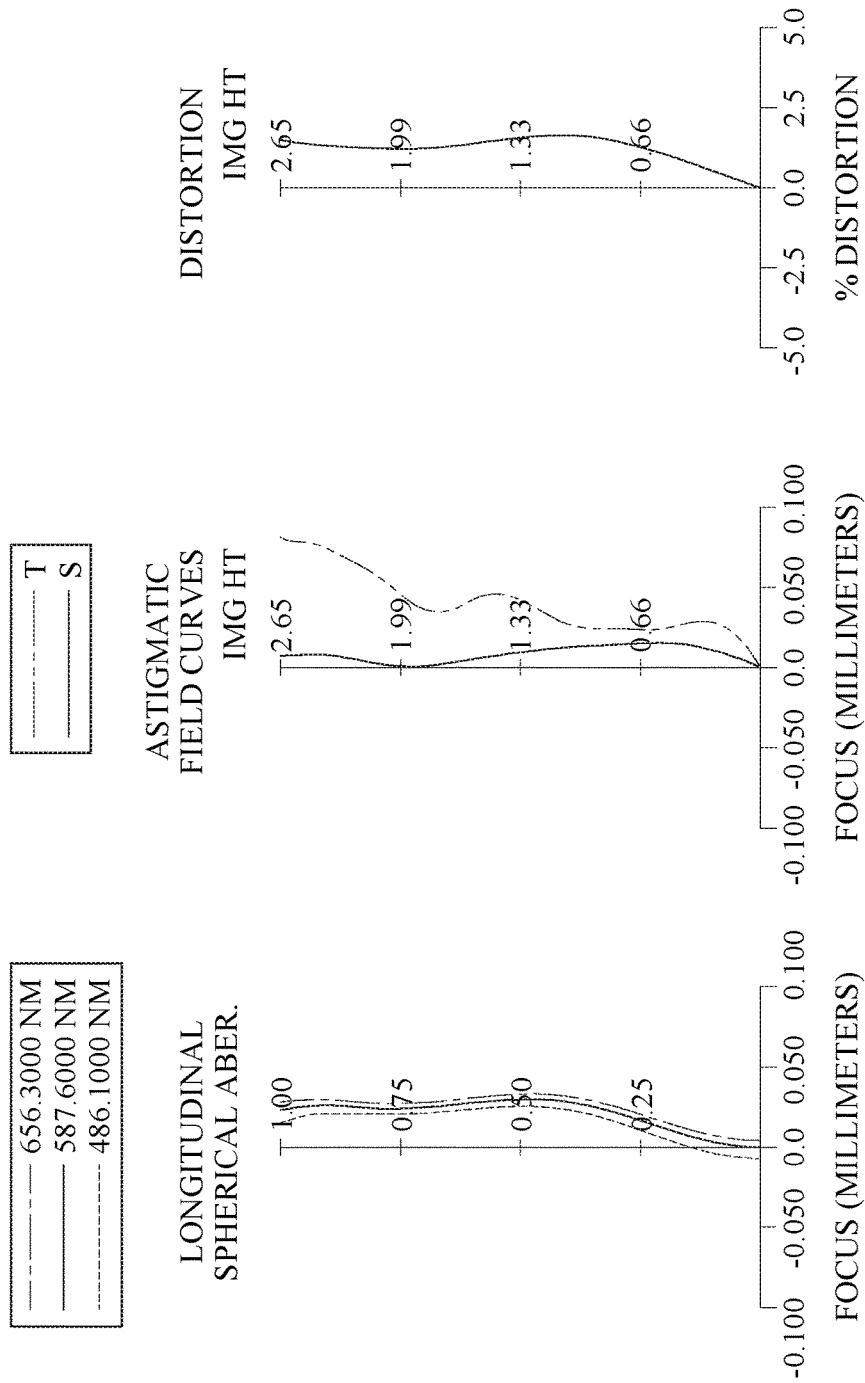
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 380. The photographing optical lens system includes five lens elements which are, in order from an object side to an image side, a first lens element 310, an aperture stop 300, a second lens element 320, a third lens element 330, a fourth lens element 340, a fifth lens element 350, an IR-cut filter 360 and an image surface 370. The photographing optical lens system includes five lens elements (310, 320, 330, 340, 350) with no additional lens element disposed between the first lens element 310 and the fifth lens element 350.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one convex critical point in an off-axial region thereof.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex critical point in an off-axial region thereof.

The IR-cut filter 360 is made of glass material and located between the fifth lens element 350 and the image surface 370, and will not affect the focal length of the photographing optical lens system. The image sensor 380 is disposed on or near the image surface 370 of the photographing optical lens system.

The detailed optical data of the 3rd embodiment are shown in Table 5 and the aspheric surface data are shown in Table 6 below.

TABLE 5

3rd Embodiment
f = 2.60 mm, Fno = 2.05, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.247 | (ASP) | 0.368 | Plastic | 1.545 | 56.0 | 3.64 |
| 2 | | 3.009 | (ASP) | 0.075 | | | | |
| 3 | Ape. Stop | Plano | | 0.221 | | | | |
| 4 | Lens 2 | −22.664 | (ASP) | 0.220 | Plastic | 1.544 | 55.9 | 3.22 |

TABLE 5-continued

3rd Embodiment
f = 2.60 mm, Fno = 2.05, HFOV = 44.9 deg.

| Surface # | | Curvature Radius | | Thickness | Material | Index | Abbe # | Focal Length |
|---|---|---|---|---|---|---|---|---|
| 5 | | −1.632 | (ASP) | 0.030 | | | | |
| 6 | Lens 3 | −3.081 | (ASP) | 0.230 | Plastic | 1.660 | 20.4 | −3.18 |
| 7 | | 6.791 | (ASP) | 0.382 | | | | |
| 8 | Lens 4 | −3.558 | (ASP) | 0.503 | Plastic | 1.639 | 23.5 | 1.38 |
| 9 | | −0.744 | (ASP) | 0.030 | | | | |
| 10 | Lens 5 | 7.901 | (ASP) | 0.444 | Plastic | 1.639 | 23.5 | −1.28 |
| 11 | | 0.722 | (ASP) | 0.600 | | | | |
| 12 | IR-cut filter | Plano | | 0.210 | Glass | 1.517 | 64.2 | — |
| 13 | | Plano | | 0.192 | | | | |
| 14 | Image | Plano | | — | | | | |

Note:
Reference wavelength is 587.6 nm (d-line).

TABLE 6

Aspheric Coefficients

| | | | Surface # | | |
|---|---|---|---|---|---|
| | 1 | 2 | 4 | 5 | 6 |
| k = | 9.7877E−01 | −2.9395E+00 | 1.6261E+01 | 1.1168E+00 | 1.1838E+01 |
| A4 = | −8.3236E−02 | −6.8666E−03 | −1.4655E−01 | −3.6058E−01 | −8.0985E−01 |
| A6 = | −6.8916E−02 | −3.3761E−01 | 1.1784E−01 | 2.1985E+00 | 3.3605E+00 |
| A8 = | 1.8581E−03 | 9.2984E−01 | −3.2949E+00 | −1.0132E+01 | −1.3211E+01 |
| A10 = | −9.8000E−01 | −3.3709E+00 | 8.8277E+00 | 1.7367E+01 | 2.6903E+01 |
| A12 = | 1.5029E+00 | 3.3271E+00 | −1.7027E+01 | −1.2532E+01 | −3.0107E+01 |
| A14 = | −1.7428E+00 | — | 1.1796E+01 | — | 1.5736E+01 |

| | | | Surface # | | |
|---|---|---|---|---|---|
| | 7 | 8 | 9 | 10 | 11 |
| k = | −3.6637E+01 | −5.9003E+01 | −5.8908E+00 | −2.1878E+01 | −5.8752E+00 |
| A4 = | −5.3261E−01 | −1.2049E−01 | −5.3586E−01 | −3.8829E−01 | −3.0292E−01 |
| A6 = | 1.2973E+00 | 7.2004E−01 | 1.3673E+00 | −3.7077E−01 | 2.6330E−01 |
| A8 = | −4.0096E+00 | −4.1970E+00 | −3.3208E+00 | 1.1465E+00 | −1.6862E−01 |
| A10 = | 7.4993E+00 | 1.0313E+01 | 4.8338E+00 | −1.0126E+00 | 7.2717E−02 |
| A12 = | −8.5163E+00 | −1.3214E+01 | −3.6215E+00 | 4.5113E−01 | −2.0018E−02 |
| A14 = | 4.3917E+00 | 8.3813E+00 | 1.3314E+00 | −1.0450E−01 | 3.1339E−03 |
| A16 = | — | −2.0572E+00 | −1.9214E−01 | 1.0041E−02 | −2.1303E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.60 | CT3/CT2 | 1.05 |
| Fno | 2.05 | ImgH/f | 1.02 |
| HFOV [deg.] | 44.9 | (R3 + R4)/(R3 − R4) | 1.16 |
| Nv12 − Nv345 | −0.10 | (R5 + R6)/(R5 − R6) | −0.38 |
| (V1 + V2) − (V3 + V4 + V5) | 44.5 | f1/f2 | 1.13 |
| V3 + V4 + V5 | 67.40 | f2/f3 | −1.01 |
| V4 | 23.5 | (f/f4) + |f/f5| | 3.92 |
| T12/T23 | 9.87 | — | — |

4th Embodiment

Figure 7:
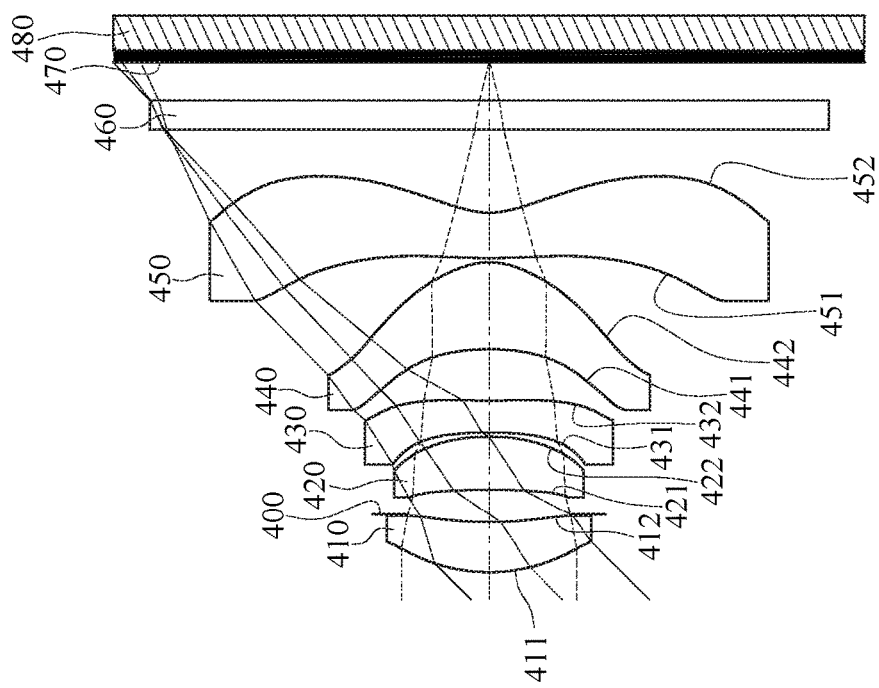
FIG. 7 is a schematic view of an image capturing unit according to the 4th embodiment of the present disclosure.
Figure 8:
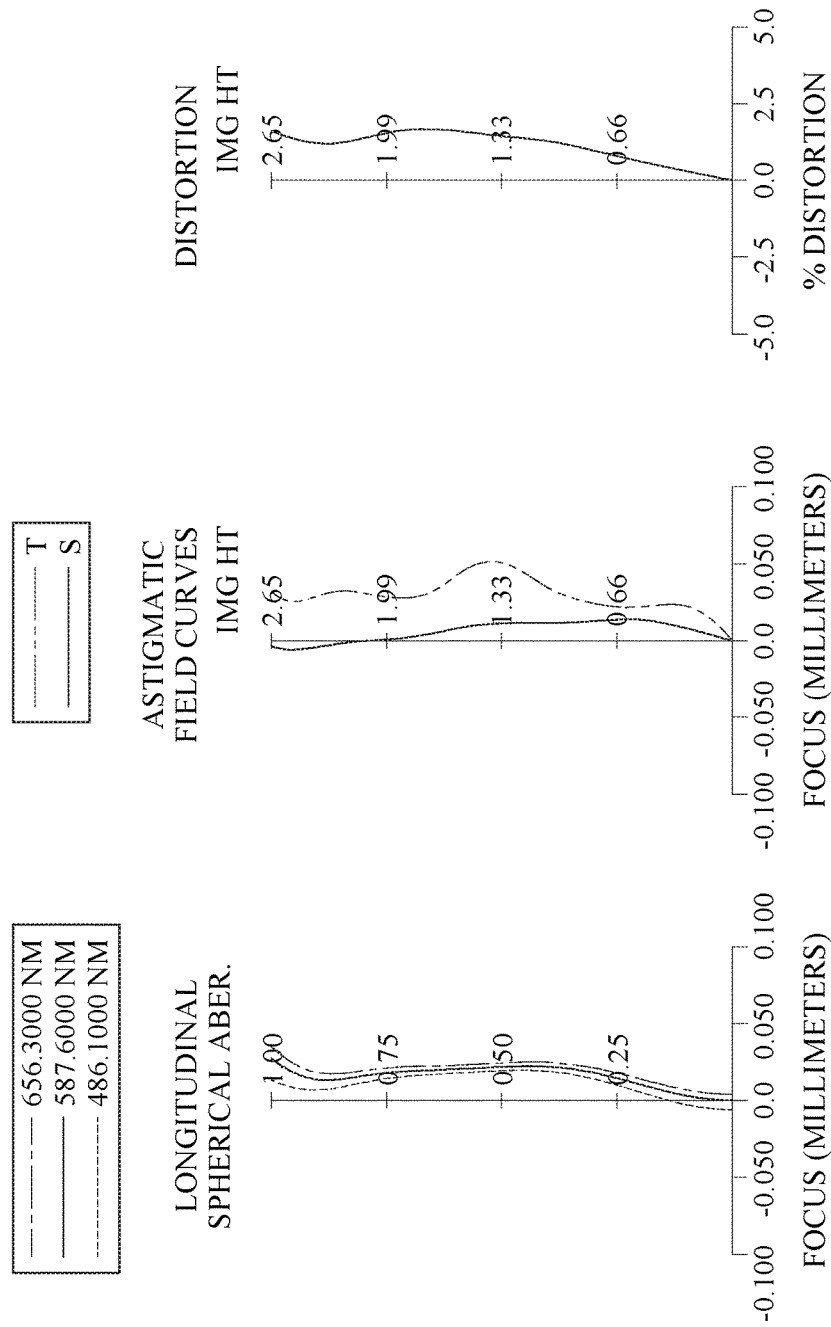
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 480. The photographing optical lens system includes five lens elements which are, in order from an object side to an image side, a first lens element 410, an aperture stop 400, a second lens element 420, a third lens element 430, a fourth lens element 440, a fifth lens element 450, an IR-cut filter 460 and an image surface 470. The photographing optical lens system includes five lens elements (410, 420, 430, 440, 450) with no additional lens element disposed between the first lens element 410 and the fifth lens element 450.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one convex critical point in an off-axial region thereof.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex critical point in an off-axial region thereof.

The IR-cut filter 460 is made of glass material and located between the fifth lens element 450 and the image surface 470, and will not affect the focal length of the photographing optical lens system. The image sensor 480 is disposed on or near the image surface 470 of the photographing optical lens system.

The detailed optical data of the 4th embodiment are shown in Table 7 and the aspheric surface data are shown in Table 8 below.

TABLE 7

4th Embodiment
f = 2.61 mm, Fno = 2.06, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.225 | (ASP) | 0.362 | Plastic | 1.545 | 56.0 | 3.72 |
| 2 | | 2.780 | (ASP) | 0.057 | | | | |
| 3 | Ape. Stop | Plano | | 0.178 | | | | |
| 4 | Lens 2 | −7.303 | (ASP) | 0.385 | Plastic | 1.544 | 55.9 | 3.53 |
| 5 | | −1.547 | (ASP) | 0.030 | | | | |
| 6 | Lens 3 | −5.168 | (ASP) | 0.230 | Plastic | 1.660 | 20.4 | −3.88 |
| 7 | | 5.166 | (ASP) | 0.371 | | | | |
| 8 | Lens 4 | −1.717 | (ASP) | 0.625 | Plastic | 1.584 | 28.2 | 1.04 |
| 9 | | −0.509 | (ASP) | 0.030 | | | | |
| 10 | Lens 5 | 4.355 | (ASP) | 0.332 | Plastic | 1.639 | 23.3 | −1.03 |
| 11 | | 0.555 | (ASP) | 0.600 | | | | |
| 12 | IR-cut filter | Plano | | 0.210 | Glass | 1.517 | 64.2 | — |
| 13 | | Plano | | 0.274 | | | | |
| 14 | Image | Plano | | — | | | | |

Note:
Reference wavelength is 587.6 nm (d-line).
An effective radius of the object-side surface 431 (Surface 6) is 0.695 mm.

TABLE 8

Aspheric Coefficients

| | Surface # | | | | |
|---|---|---|---|---|---|
| | 1 | 2 | 4 | 5 | 6 |
| k = | 1.2778E+00 | −2.9383E+00 | 1.6267E+01 | 6.2656E−01 | 2.3893E+01 |
| A4 = | −1.0811E−01 | −4.0031E−03 | −9.6820E−02 | −7.9552E−01 | −1.4027E+00 |
| A6 = | 1.2201E−01 | −2.1740E−01 | −3.6494E−01 | 4.8278E+00 | 6.1816E+00 |
| A8 = | −9.7945E−01 | 2.8781E−01 | −8.4946E−01 | −1.7397E+01 | −2.0098E+01 |
| A10 = | 5.0057E−01 | −2.3879E+00 | 6.0490E+00 | 2.8328E+01 | 3.2337E+01 |
| A12 = | 2.0001E+00 | 2.0390E+00 | −2.0819E+01 | −1.9371E+01 | −2.7089E+01 |
| A14 = | −4.9632E+00 | — | 1.8510E+01 | — | 7.0468E+00 |

| | Surface # | | | | |
|---|---|---|---|---|---|
| | 7 | 8 | 9 | 10 | 11 |
| k = | −6.0299E+01 | −3.4945E−01 | −3.8678E+00 | −1.1843E+01 | −6.0858E+00 |
| A4 = | −7.6294E−01 | −4.8700E−01 | −6.5258E−01 | −1.9433E−01 | −1.6172E−01 |
| A6 = | 2.2359E+00 | 1.5546E+00 | 9.7029E−01 | −5.1458E−02 | 8.7841E−02 |
| A8 = | −5.6683E+00 | −8.5303E+00 | −1.4537E+00 | 2.9026E−01 | −2.7984E−02 |
| A10 = | 8.9491E+00 | 2.4037E+01 | 5.5346E−01 | −2.7212E−01 | 3.6161E−03 |
| A12 = | −8.7626E+00 | −3.4165E+01 | 1.3548E+00 | 1.1818E−01 | 1.0456E−04 |

TABLE 8-continued

| Aspheric Coefficients | | | | | |
|---|---|---|---|---|---|
| A14 = | 3.9645E+00 | 2.4181E+01 | −1.4319E+00 | −2.5175E−02 | −8.2910E−05 |
| A16 = | — | −6.7236E+00 | 3.9574E−01 | 2.1475E−03 | 7.9189E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.61 | CT3/CT2 | 0.60 |
| Fno | 2.06 | ImgH/f | 1.02 |
| HFOV [deg.] | 44.9 | (R3 + R4)/(R3 − R4) | 1.54 |
| Nv12 − Nv345 | −0.08 | (R5 + R6)/(R5 − R6) | 0.00014 |
| (V1 + V2) − (V3 + V4 + V5) | 40.0 | f1/f2 | 1.05 |
| V3 + V4 + V5 | 71.90 | f2/f3 | −0.91 |
| V4 | 28.2 | (f/f4) + |f/f5| | 5.04 |
| T12/T23 | 7.83 | — | — |

5th Embodiment

Figure 9:
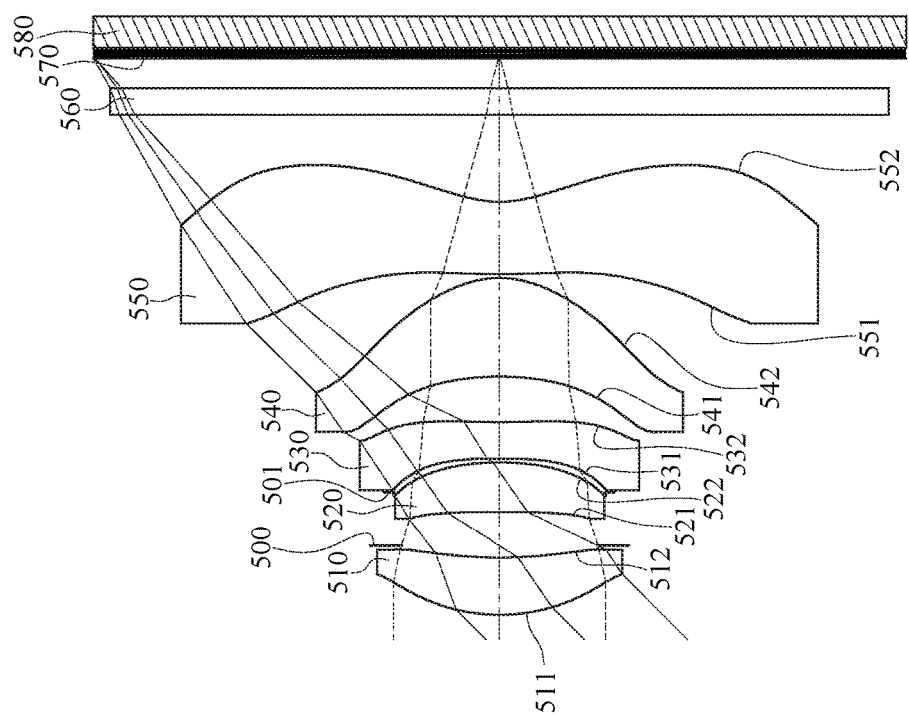
FIG. 9 is a schematic view of an image capturing unit according to the 5th embodiment of the present disclosure.
Figure 10:
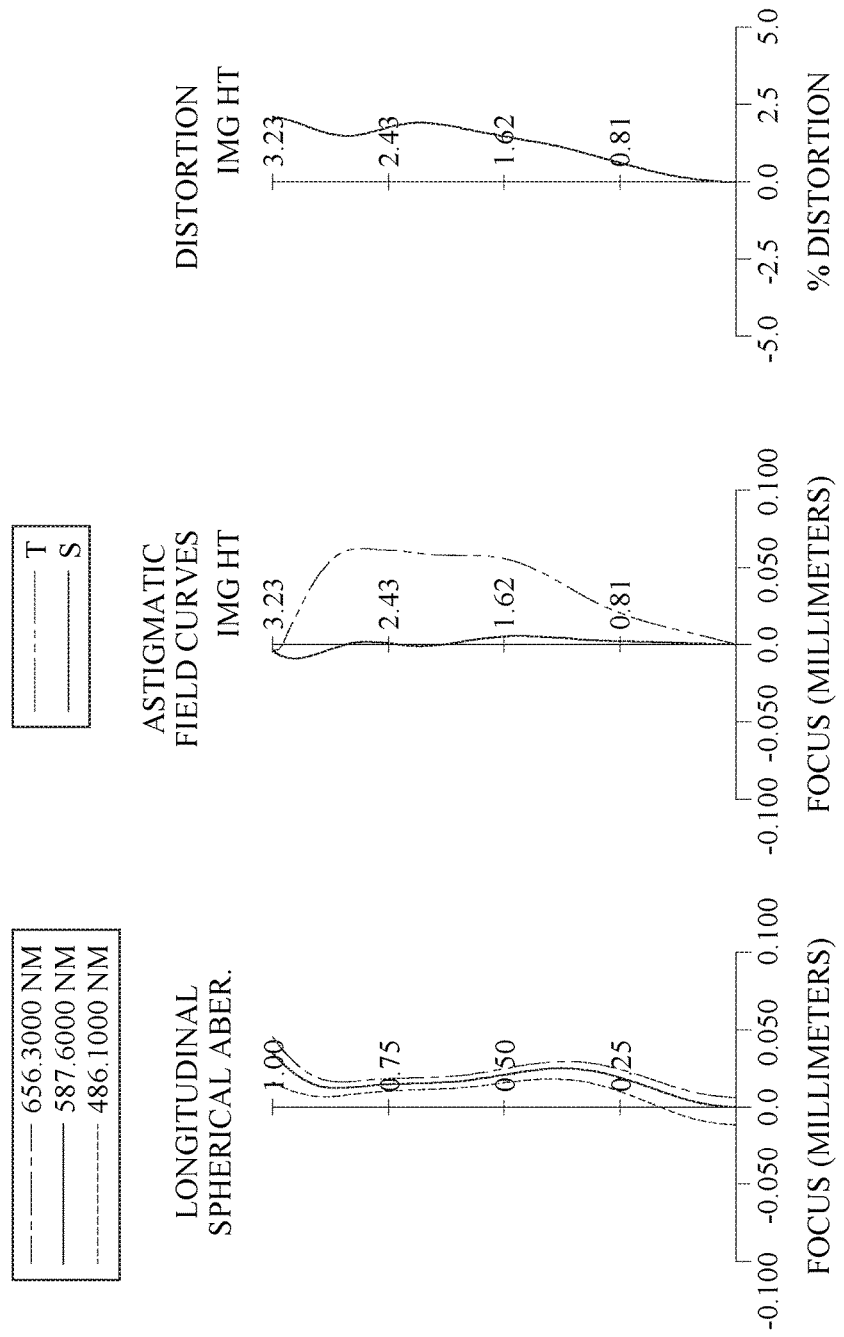
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 580. The photographing optical lens system includes five lens elements which are, in order from an object side to an image side, a first lens element 510, an aperture stop 500, a second lens element 520, a stop 501, a third lens element 530, a fourth lens element 540, a fifth lens element 550, an IR-cut filter 560 and an image surface 570. The photographing optical lens system includes five lens elements (510, 520, 530, 540, 550) with no additional lens element disposed between the first lens element 510 and the fifth lens element 550.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has at least one convex critical point in an off-axial region thereof.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axial region thereof.

The IR-cut filter 560 is made of glass material and located between the fifth lens element 550 and the image surface 570, and will not affect the focal length of the photographing optical lens system. The image sensor 580 is disposed on or near the image surface 570 of the photographing optical lens system.

The detailed optical data of the 5th embodiment are shown in Table 9 and the aspheric surface data are shown in Table 10 below.

TABLE 9

5th Embodiment
f = 3.17 mm, Fno = 1.86, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.483 | (ASP) | 0.460 | Plastic | 1.545 | 56.1 | 4.19 |
| 2 | | 3.764 | (ASP) | 0.096 | | | | |
| 3 | Ape. Stop | Plano | | 0.274 | | | | |
| 4 | Lens 2 | −11.588 | (ASP) | 0.397 | Plastic | 1.544 | 56.0 | 5.67 |
| 5 | | −2.465 | (ASP) | −0.240 | | | | |
| 6 | Stop | Plano | | 0.270 | | | | |
| 7 | Lens 3 | −9.905 | (ASP) | 0.293 | Plastic | 1.660 | 20.4 | −5.57 |

TABLE 9-continued

5th Embodiment
f = 3.17 mm, Fno = 1.86, HFOV = 44.9 deg.

| Surface # | | Curvature Radius | | Thickness | Material | Index | Abbe # | Focal Length |
|---|---|---|---|---|---|---|---|---|
| 8 | | 5.917 | (ASP) | 0.365 | | | | |
| 9 | Lens 4 | −2.276 | (ASP) | 0.791 | Plastic | 1.584 | 28.2 | 1.65 |
| 10 | | −0.764 | (ASP) | 0.030 | | | | |
| 11 | Lens 5 | 6.386 | (ASP) | 0.584 | Plastic | 1.639 | 23.3 | −1.63 |
| 12 | | 0.864 | (ASP) | 0.700 | | | | |
| 13 | IR-cut filter | Plano | | 0.210 | Glass | 1.517 | 64.2 | — |
| 14 | | Plano | | 0.240 | | | | |
| 15 | Image | Plano | | — | | | | |

Note:
Reference wavelength is 587.6 nm (d-line).
An effective radius of the stop 501 (Surface 6) is 0.850 mm.

TABLE 10

Aspheric Coefficients

| | Surface # | | | | |
|---|---|---|---|---|---|
| | 1 | 2 | 4 | 5 | 7 |
| k = | 7.7244E−01 | −4.7933E−01 | 4.6478E+01 | 3.5419E−01 | 4.9338E+01 |
| A4 = | −5.1489E−02 | 9.8867E−03 | −2.5116E−02 | −4.7686E−01 | −7.0693E−01 |
| A6 = | 1.2149E−01 | −1.5305E−01 | −2.4175E−01 | 1.6967E+00 | 1.7088E+00 |
| A8 = | −3.8733E−01 | 4.8228E−01 | 7.5496E−01 | −4.2305E+00 | −3.5443E+00 |
| A10 = | 4.8395E−01 | −1.0802E+00 | −2.3321E+00 | 4.9062E+00 | 3.1405E+00 |
| A12 = | −3.1269E−01 | 9.0862E−01 | 3.1531E+00 | −2.2998E+00 | −4.3953E−01 |
| A14 = | 5.8382E−03 | −2.7325E−01 | −1.7640E+00 | — | −7.0730E−01 |

| | Surface # | | | | |
|---|---|---|---|---|---|
| | 8 | 9 | 10 | 11 | 12 |
| k = | −2.3563E+01 | −3.1097E+00 | −3.3128E+00 | −9.0000E+01 | −6.0053E+00 |
| A4 = | −3.1629E−01 | −1.0260E−01 | −1.7622E−01 | −7.3760E−02 | −9.0485E−02 |
| A6 = | 4.2728E−01 | 8.1848E−02 | 1.6808E−01 | −8.8799E−02 | 3.6498E−02 |
| A8 = | −6.6815E−01 | −6.4602E−01 | 7.9877E−02 | 1.4125E−01 | −1.0792E−02 |
| A10 = | 6.5772E−01 | 1.3694E+00 | −1.8450E−01 | −8.1786E−02 | 2.3434E−03 |
| A12 = | −4.1018E−01 | −1.3783E+00 | 1.9612E−01 | 2.3735E−02 | −3.9193E−04 |
| A14 = | 1.2728E−01 | 6.9435E−01 | −8.5297E−02 | −3.4320E−03 | 4.0349E−05 |
| A16 = | — | −1.3623E−01 | 1.2992E−02 | 1.9722E−04 | −1.7282E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.17 | CT3/CT2 | 0.74 |
| Fno | 1.86 | ImgH/f | 1.02 |
| HFOV [deg.] | 44.9 | (R3 + R4)/(R3 − R4) | 1.54 |
| Nv12 − Nv345 | −0.08 | (R5 + R6)/(R5 − R6) | 0.25 |
| (V1 + V2) − (V3 + V4 + V5) | 40.2 | f1/f2 | 0.74 |
| V3 + V4 + V5 | 71.90 | f2/f3 | −1.02 |
| V4 | 28.2 | (f/f4) + |f/f5| | 3.87 |
| T12/T23 | 12.33 | — | — |

6th Embodiment

Figure 11:
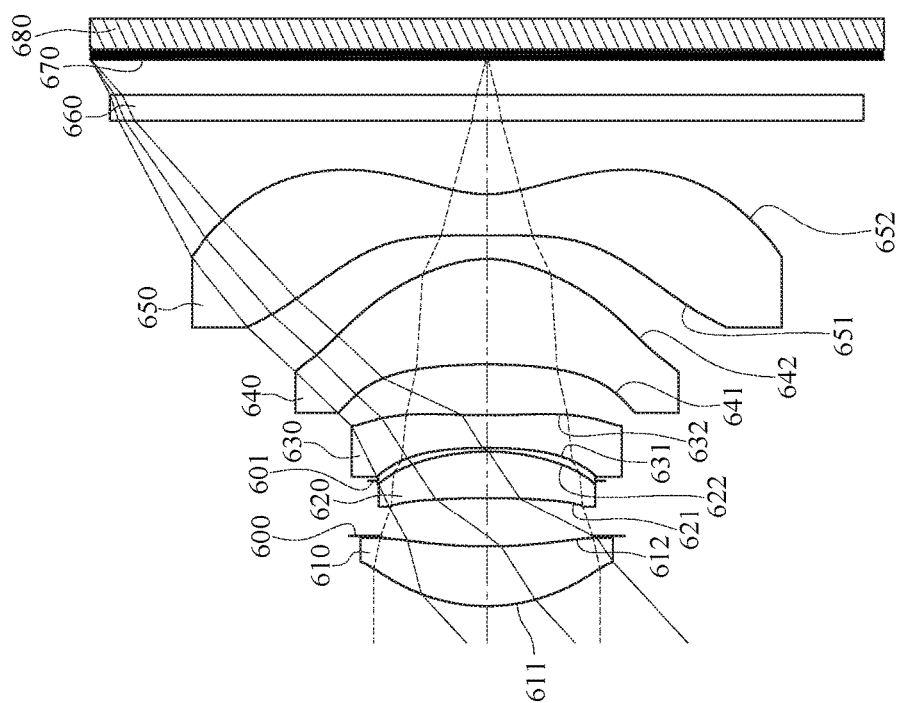
FIG. 11 is a schematic view of an image capturing unit according to the 6th embodiment of the present disclosure.
Figure 12:
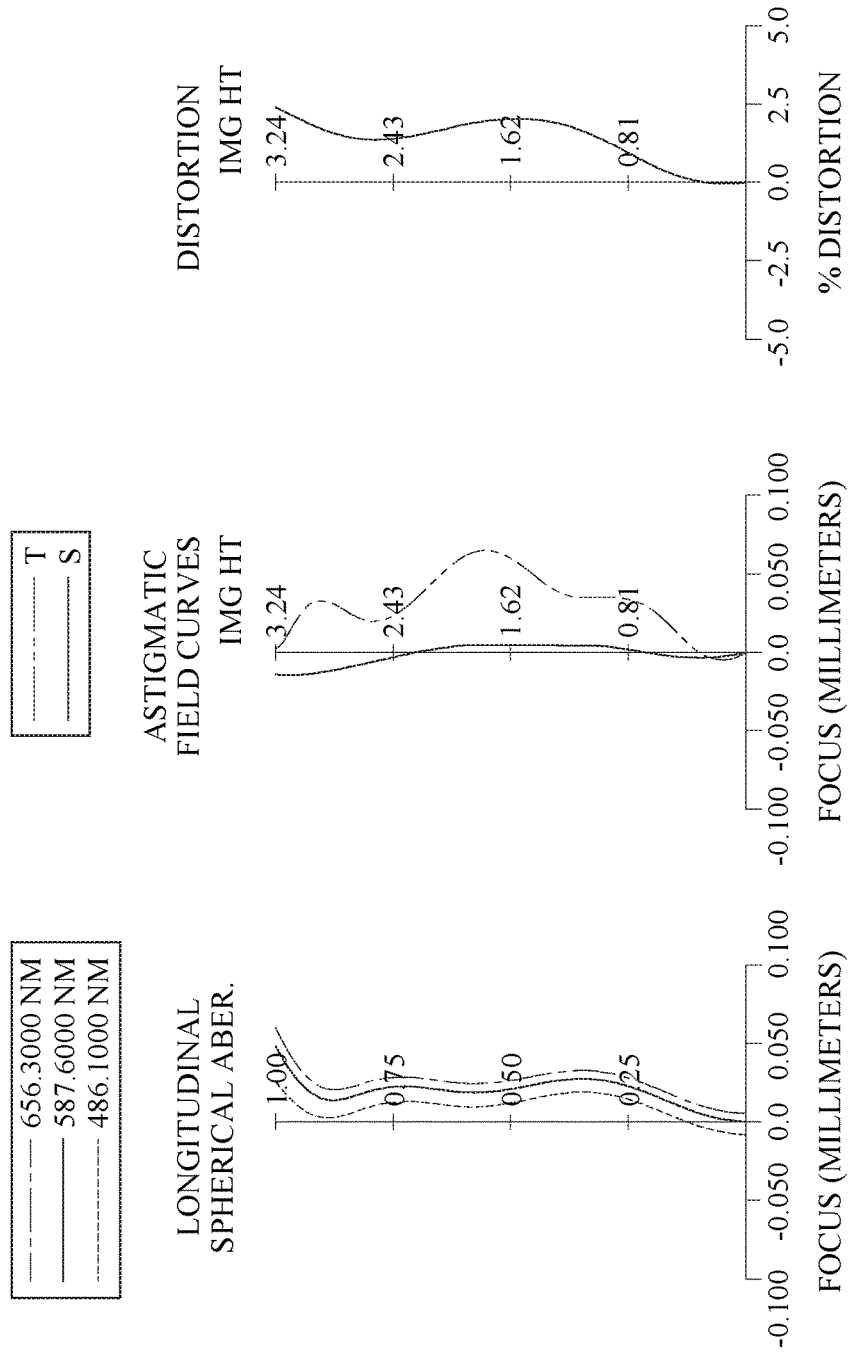
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 680. The photographing optical lens system includes five lens elements which are, in order from an object side to an image side, a first lens element 610, an aperture stop 600, a second lens element 620, a stop 601, a third lens element 630, a fourth lens element 640, a fifth lens element 650, an IR-cut filter 660 and an image surface 670. The photographing optical lens system includes five lens elements (610, 620, 630, 640, 650) with no additional lens element disposed between the first lens element 610 and the fifth lens element 650.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one convex critical point in an off-axial region thereof.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex critical point in an off-axial region thereof.

The IR-cut filter 660 is made of glass material and located between the fifth lens element 650 and the image surface 670, and will not affect the focal length of the photographing optical lens system. The image sensor 680 is disposed on or near the image surface 670 of the photographing optical lens system.

The detailed optical data of the 6th embodiment are shown in Table 11 and the aspheric surface data are shown in Table 12 below.

TABLE 11

6th Embodiment
f = 3.42 mm, Fno = 1.85, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 2 | Lens 1 | 1.505 | (ASP) | 0.487 | Plastic | 1.545 | 56.1 | 4.01 |
| 3 | | 4.278 | (ASP) | 0.087 | | | | |
| 1 | Ape. Stop | Plano | | 0.311 | | | | |
| 4 | Lens 2 | −10.030 | (ASP) | 0.381 | Plastic | 1.544 | 56.0 | 3.98 |
| 5 | | −1.804 | (ASP) | −0.241 | | | | |
| 1 | Stop | Plano | | 0.271 | | | | |
| 6 | Lens 3 | −4.665 | (ASP) | 0.266 | Plastic | 1.660 | 20.4 | −3.63 |
| 7 | | 5.027 | (ASP) | 0.416 | | | | |
| 8 | Lens 4 | −4.702 | (ASP) | 0.860 | Plastic | 1.639 | 23.3 | 1.72 |
| 9 | | −0.954 | (ASP) | 0.194 | | | | |
| 10 | Lens 5 | −29.307 | (ASP) | 0.340 | Plastic | 1.639 | 23.3 | −1.52 |
| 11 | | 1.010 | (ASP) | 0.600 | | | | |
| 12 | IR-cut filter | Plano | | 0.210 | Glass | 1.517 | 64.2 | — |
| 13 | | Plano | | 0.285 | | | | |
| 14 | Image | Plano | | — | | | | |

Note:
Reference wavelength is 587.6 nm (d-line).
An effective radius of the stop 601 (Surface 6) is 0.890 mm.

TABLE 12

Aspheric Coefficients

| Surface # | | | | | |
|---|---|---|---|---|---|
| | 1 | 2 | 4 | 5 | 7 |
| k = | 6.7755E−01 | 3.3549E+00 | −2.1965E+01 | −4.0948E+00 | −3.3560E+01 |
| A4 = | −4.0383E−02 | 2.4221E−03 | −3.2269E−02 | −3.3999E−02 | −3.2727E−01 |
| A6 = | 7.8816E−02 | −8.6075E−02 | −1.2614E−03 | −1.5565E−01 | 3.2802E−01 |
| A8 = | −2.6514E−01 | 1.9649E−01 | −4.8316E−01 | 2.3516E−01 | −4.7026E−01 |
| A10 = | 3.2219E−01 | −3.1916E−01 | 1.2768E+00 | −3.4763E−01 | 4.2103E−01 |
| A12 = | −1.8676E−01 | 1.3787E−01 | −1.5963E+00 | 1.0055E−01 | −4.8123E−01 |
| A14 = | — | — | 6.8383E−01 | 3.0602E−02 | 2.7481E−01 |

| Surface # | | | | | |
|---|---|---|---|---|---|
| | 8 | 9 | 10 | 11 | 12 |
| k = | −1.2848E+01 | −1.0837E+01 | −1.0769E+00 | −9.6461E+00 | −6.2682E+00 |
| A4 = | −2.9906E−01 | −6.6339E−02 | 3.5712E−01 | −8.9635E−02 | −1.3466E−01 |
| A6 = | 4.2787E−01 | 8.9465E−02 | −6.0614E−01 | −1.5573E−01 | 5.7670E−02 |
| A8 = | −6.7714E−01 | −3.4143E−01 | 6.4863E−01 | 1.7883E−01 | −1.8434E−02 |
| A10 = | 7.4824E−01 | 3.5491E−01 | −4.8024E−01 | −8.2886E−02 | 3.9412E−03 |
| A12 = | −5.1244E−01 | −1.2013E−01 | 2.2214E−01 | 2.0609E−02 | −5.4787E−04 |

TABLE 12-continued

| Aspheric Coefficients | | | | | |
|---|---|---|---|---|---|
| A14 = | 1.5947E−01 | −4.4638E−02 | −5.4116E−02 | −2.6913E−03 | 4.3285E−05 |
| A16 = | — | 2.9048E−02 | 5.1811E−03 | 1.4448E−04 | −1.4214E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.42 | CT3/CT2 | 0.70 |
| Fno | 1.85 | ImgH/f | 0.95 |
| HFOV [deg.] | 42.6 | (R3 + R4)/(R3 − R4) | 1.44 |
| Nv12 − Nv345 | −0.10 | (R5 + R6)/(R5 − R6) | −0.04 |
| (V1 + V2) − (V3 + V4 + V5) | 45.1 | f1/f2 | 1.01 |
| V3 + V4 + V5 | 67.00 | f2/f3 | −1.10 |
| V4 | 23.3 | (f/f4) + |f/f5| | 4.24 |
| T12/T23 | 13.27 | — | — |

7th Embodiment

Figure 13:
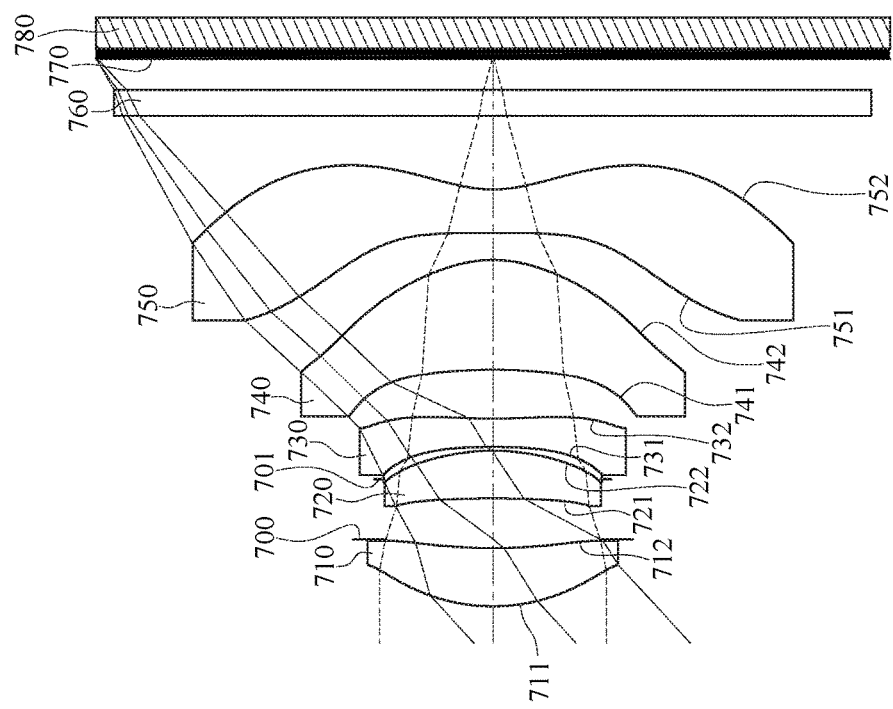
FIG. 13 is a schematic view of an image capturing unit according to the 7th embodiment of the present disclosure.
Figure 14:
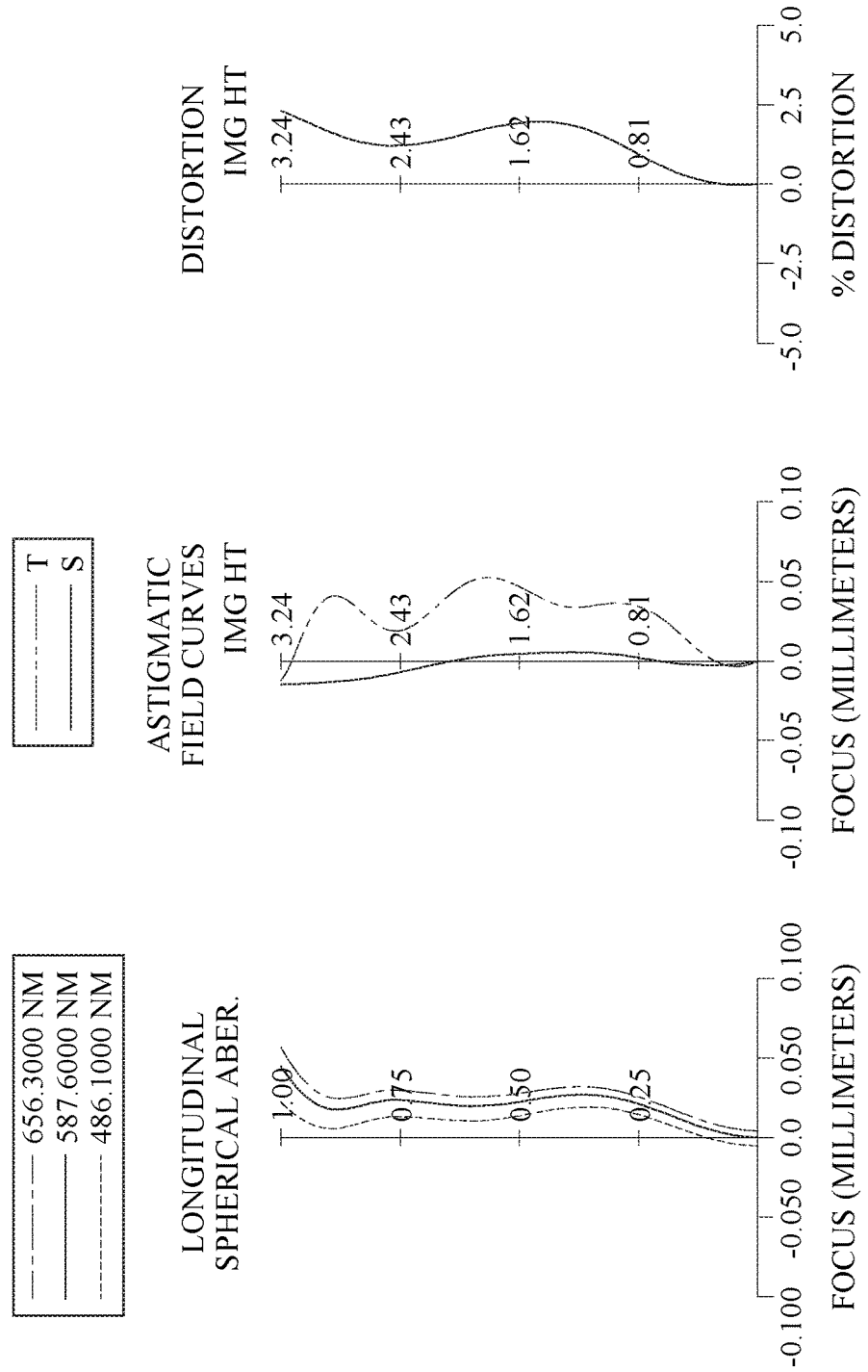
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 780. The photographing optical lens system includes five lens elements which are, in order from an object side to an image side, a first lens element 710, an aperture stop 700, a second lens element 720, a stop 701, a third lens element 730, a fourth lens element 740, a fifth lens element 750, an IR-cut filter 760 and an image surface 770. The photographing optical lens system includes five lens elements (710, 720, 730, 740, 750) with no additional lens element disposed between the first lens element 710 and the fifth lens element 750.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has at least one convex critical point in an off-axial region thereof.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axial region thereof.

The IR-cut filter 760 is made of glass material and located between the fifth lens element 750 and the image surface 770, and will not affect the focal length of the photographing optical lens system. The image sensor 780 is disposed on or near the image surface 770 of the photographing optical lens system.

The detailed optical data of the 7th embodiment are shown in Table 13 and the aspheric surface data are shown in Table 14 below.

TABLE 13

7th Embodiment
f = 3.42 mm, Fno = 1.85, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.520 | (ASP) | 0.475 | Plastic | 1.545 | 56.1 | 3.99 |
| 2 | | 4.501 | (ASP) | 0.071 | | | | |
| 3 | Ape. Stop | Plano | | 0.333 | | | | |
| 4 | Lens 2 | −9.579 | (ASP) | 0.389 | Plastic | 1.545 | 56.1 | 3.69 |
| 5 | | −1.684 | (ASP) | −0.230 | | | | |
| 6 | Stop | Plano | | 0.260 | | | | |
| 7 | Lens 3 | −5.430 | (ASP) | 0.230 | Plastic | 1.660 | 20.4 | −3.39 |

TABLE 13-continued

7th Embodiment
f = 3.42 mm, Fno = 1.85, HFOV = 42.6 deg.

| Surface # | | Curvature Radius | | Thickness | Material | Index | Abbe # | Focal Length |
|---|---|---|---|---|---|---|---|---|
| 8 | | 3.867 | (ASP) | 0.404 | | | | |
| 9 | Lens 4 | −4.576 | (ASP) | 0.895 | Plastic | 1.639 | 23.3 | 1.86 |
| 10 | | −1.015 | (ASP) | 0.219 | | | | |
| 11 | Lens 5 | −98.910 | (ASP) | 0.354 | Plastic | 1.639 | 23.3 | −1.63 |
| 12 | | 1.052 | (ASP) | 0.600 | | | | |
| 13 | IR-cut filter | Plano | | 0.210 | Glass | 1.517 | 64.2 | — |
| 14 | | Plano | | 0.258 | | | | |
| 15 | Image | Plano | | — | | | | |

Note:
Reference wavelength is 587.6 nm (d-line).
An effective radius of the stop 701 (Surface 6) is 0.890 mm.

TABLE 14

Aspheric Coefficients

| Surface # | | | | | |
|---|---|---|---|---|---|
| | 1 | 2 | 4 | 5 | 7 |
| k = | 7.4202E−01 | 3.4996E+00 | −8.2524E+01 | −4.9981E+00 | −3.1452E+01 |
| A4 = | −4.2250E−02 | 9.3042E−04 | −1.7807E−02 | 1.1484E−01 | −2.2490E−01 |
| A6 = | 6.4989E−02 | −1.0056E−01 | −1.4051E−01 | −8.7616E−01 | −1.7250E−01 |
| A8 = | −2.4717E−01 | 2.1658E−01 | 1.9369E−01 | 2.2640E+00 | 8.8896E−01 |
| A10 = | 2.9999E−01 | −3.3927E−01 | −3.3258E−01 | −3.6739E+00 | −1.7119E+00 |
| A12 = | −1.8373E−01 | 1.4581E−01 | 3.1566E−01 | 3.0039E+00 | 1.2425E+00 |
| A14 = | — | — | −1.9017E−01 | −1.0048E+00 | −2.7529E−01 |

| Surface # | | | | | |
|---|---|---|---|---|---|
| | 8 | 9 | 10 | 11 | 12 |
| k = | −1.2855E+01 | −8.0491E+00 | −1.0309E+00 | −9.0000E+01 | −6.1670E+00 |
| A4 = | −3.3846E−01 | −4.3001E−02 | 2.9395E−01 | −1.2312E−01 | −1.3241E−01 |
| A6 = | 4.9586E−01 | −1.4434E−02 | −4.7610E−01 | −9.6964E−02 | 5.6184E−02 |
| A8 = | −7.6847E−01 | −2.6178E−02 | 4.9297E−01 | 1.1928E−01 | −1.8318E−02 |
| A10 = | 8.4059E−01 | −2.2685E−01 | −3.5954E−01 | −4.9787E−02 | 4.0975E−03 |
| A12 = | −5.9247E−01 | 5.0312E−01 | 1.6450E−01 | 1.0827E−02 | −5.9494E−04 |
| A14 = | 1.9365E−01 | −4.0756E−01 | −3.9241E−02 | −1.2369E−03 | 4.9544E−05 |
| A16 = | — | 1.1508E−01 | 3.6183E−03 | 5.8764E−05 | −1.7461E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.42 | CT3/CT2 | 0.59 |
| Fno | 1.85 | ImgH/f | 0.95 |
| HFOV [deg.] | 42.6 | (R3 + R4)/(R3 − R4) | 1.43 |
| Nv12 − Nv345 | −0.10 | (R5 + R6)/(R5 − R6) | 0.17 |
| (V1 + V2) − (V3 + V4 + V5) | 45.2 | f1/f2 | 1.08 |
| V3 + V4 + V5 | 67.00 | f2/f3 | −1.09 |
| V4 | 23.3 | (f/f4) + |f/f5| | 3.94 |
| T12/T23 | 13.47 | — | — |

8th Embodiment

Figure 15:
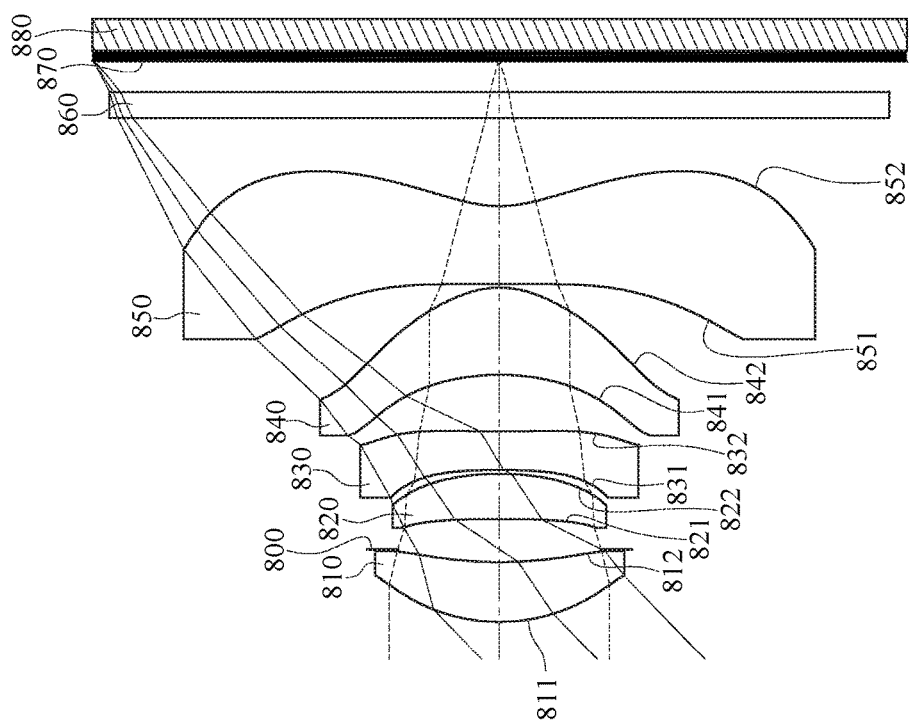
FIG. 15 is a schematic view of an image capturing unit according to the 8th embodiment of the present disclosure.
Figure 16:
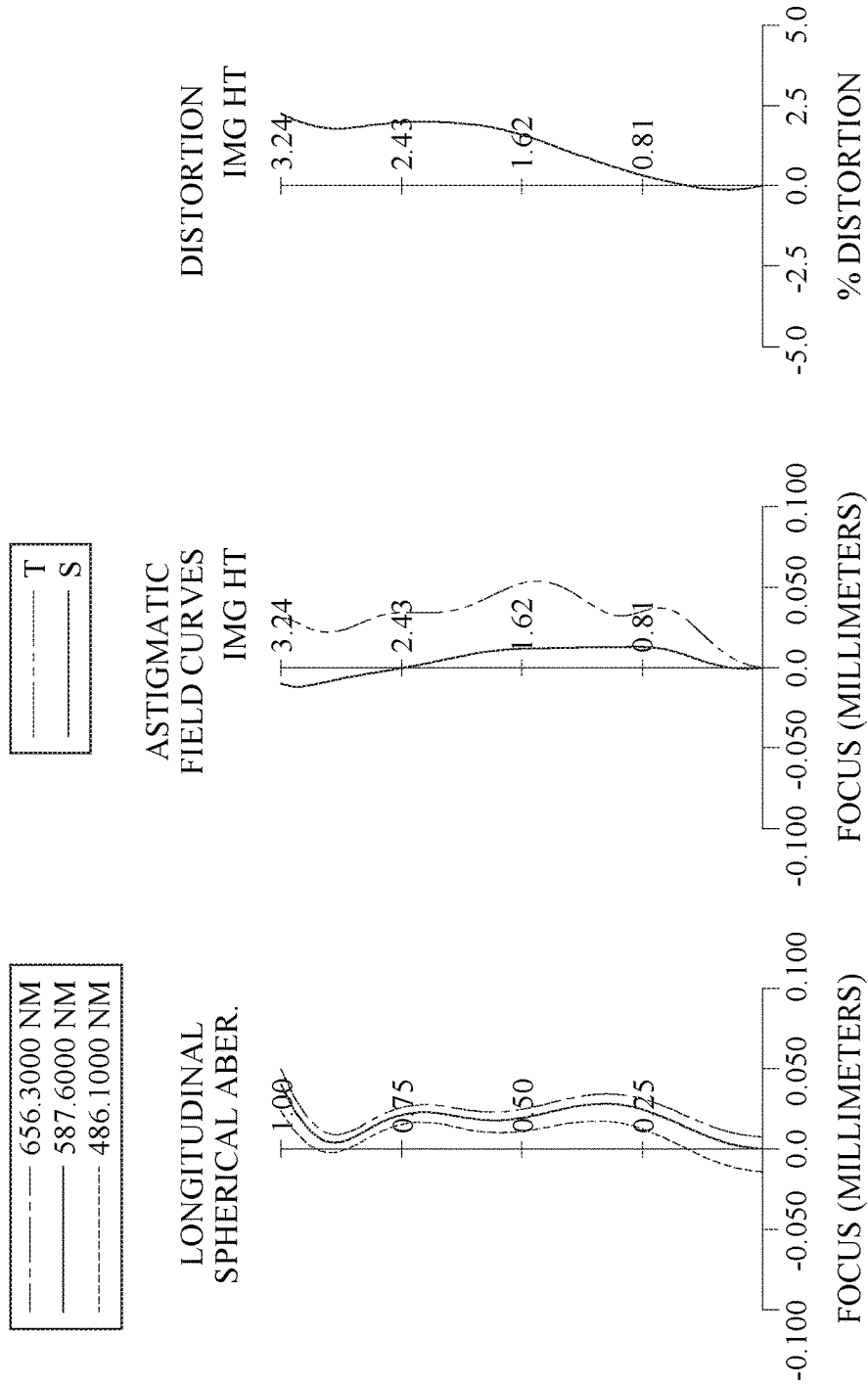
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens system (its reference numeral is omitted) of the present disclosure and an image sensor 880. The photographing optical lens system includes five lens elements which are, in order from an object side to an image side, a first lens element 810, an aperture stop 800, a second lens element 820, a third lens element 830, a fourth lens element 840, a fifth lens element 850, an IR-cut filter 860 and an image surface 870. The photographing optical lens system includes five lens elements (810, 820, 830, 840, 850) with no additional lens element disposed between the first lens element 810 and the fifth lens element 850.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one convex critical point in an off-axial region thereof.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axial region thereof.

The IR-cut filter 860 is made of glass material and located between the fifth lens element 850 and the image surface 870, and will not affect the focal length of the photographing optical lens system. The image sensor 880 is disposed on or near the image surface 870 of the photographing optical lens system.

The detailed optical data of the 8th embodiment are shown in Table 15 and the aspheric surface data are shown in Table 16 below.

TABLE 15

8th Embodiment
f = 3.28 mm, Fno = 1.87, HFOV = 43.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.455 | (ASP) | 0.477 | Plastic | 1.545 | 56.1 | 4.21 |
| 2 | | 3.523 | (ASP) | 0.101 | | | | |
| 3 | Ape. Stop | Plano | | 0.241 | | | | |
| 4 | Lens 2 | −9.626 | (ASP) | 0.358 | Plastic | 1.544 | 56.0 | 6.21 |
| 5 | | −2.534 | (ASP) | 0.030 | | | | |
| 6 | Lens 3 | −10.485 | (ASP) | 0.307 | Plastic | 1.660 | 20.4 | −7.05 |
| 7 | | 8.460 | (ASP) | 0.451 | | | | |
| 8 | Lens 4 | −1.945 | (ASP) | 0.699 | Plastic | 1.588 | 32.1 | 1.60 |
| 9 | | −0.720 | (ASP) | 0.030 | | | | |
| 10 | Lens 5 | −63.658 | (ASP) | 0.617 | Plastic | 1.592 | 27.6 | −1.50 |
| 11 | | 0.905 | (ASP) | 0.700 | | | | |
| 12 | IR-cut filter | Plano | | 0.210 | Glass | 1.517 | 64.2 | — |
| 13 | | Plano | | 0.246 | | | | |
| 14 | Image | Plano | | — | | | | |

Note:
Reference wavelength is 587.6 nm (d-line).
An effective radius of the image-side surface 822 (Surface 5) is 0.850 mm.

TABLE 16

Aspheric Coefficients

| | Surface # | | | | |
|---|---|---|---|---|---|
| | 1 | 2 | 4 | 5 | 6 |
| k = | 6.3453E−01 | 1.5372E+00 | −1.4475E+01 | 5.0225E−01 | 1.6732E+01 |
| A4 = | −3.7141E−02 | 1.0444E−02 | −4.6122E−02 | −3.4572E−01 | −5.2632E−01 |
| A6 = | 1.0936E−01 | −8.6050E−02 | −1.3900E−03 | 1.0415E+00 | 1.4438E+00 |
| A8 = | −3.7079E−01 | 2.4696E−01 | −6.1584E−01 | −2.6174E+00 | −4.7617E+00 |
| A10 = | 5.2497E−01 | −4.9602E−01 | 1.7732E+00 | 3.4362E+00 | 1.0571E+01 |
| A12 = | −3.5556E−01 | 2.5954E−01 | −2.6258E+00 | −2.4035E+00 | −1.5572E+01 |
| A14 = | 3.7373E−02 | — | 1.3894E+00 | 6.4617E−01 | 1.3196E+01 |
| A16 = | — | — | — | — | −4.8464E+00 |

| | Surface # | | | | |
|---|---|---|---|---|---|
| | 7 | 8 | 9 | 10 | 11 |
| k = | 1.8134E+01 | −3.4174E+00 | −3.0199E+00 | −1.0000E+00 | −7.5122E+00 |
| A4 = | −2.2500E−01 | −1.8064E−01 | −1.1214E−01 | −5.6756E−03 | −6.3079E−02 |
| A6 = | 3.3321E−01 | 4.0085E−01 | −1.3177E−01 | −9.2697E−02 | 2.0961E−02 |
| A8 = | −7.4368E−01 | −1.2295E+00 | 4.0363E−01 | 8.0398E−02 | −6.3072E−03 |
| A10 = | 1.0832E+00 | 1.9705E+00 | −6.0483E−01 | −3.1236E−02 | 1.2509E−03 |

TABLE 16-continued

| Aspheric Coefficients | | | | | |
|---|---|---|---|---|---|
| A12 = | −9.7627E−01 | −1.7591E+00 | 4.7894E−01 | 5.8126E−03 | −1.5010E−04 |
| A14 = | 4.6483E−01 | 8.3317E−01 | −1.7807E−01 | −4.1642E−04 | 7.7536E−06 |
| A16 = | −7.8277E−02 | −1.5797E−01 | 2.4802E−02 | — | −2.9661E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.28 | CT3/CT2 | 0.86 |
| Fno | 1.87 | ImgH/f | 0.99 |
| HFOV [deg.] | 43.8 | (R3 + R4)/(R3 − R4) | 1.71 |
| Nv12 − Nv345 | −0.07 | (R5 + R6)/(R5 − R6) | 0.11 |
| (V1 + V2) − (V3 + V4 + V5) | 32.0 | f1/f2 | 0.68 |
| V3 + V4 + V5 | 80.10 | f2/f3 | −0.88 |
| V4 | 32.1 | (f/f4) + |f/f5| | 4.24 |
| T12/T23 | 11.40 | — | — |

9th Embodiment

Figure 17:
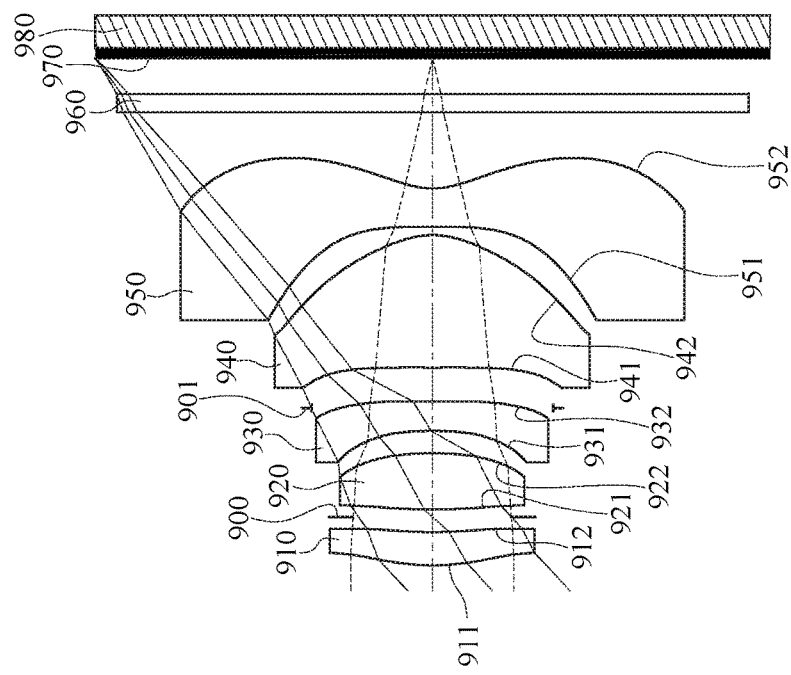
FIG. 17 is a schematic view of an image capturing unit according to the 9th embodiment of the present disclosure.
Figure 18:
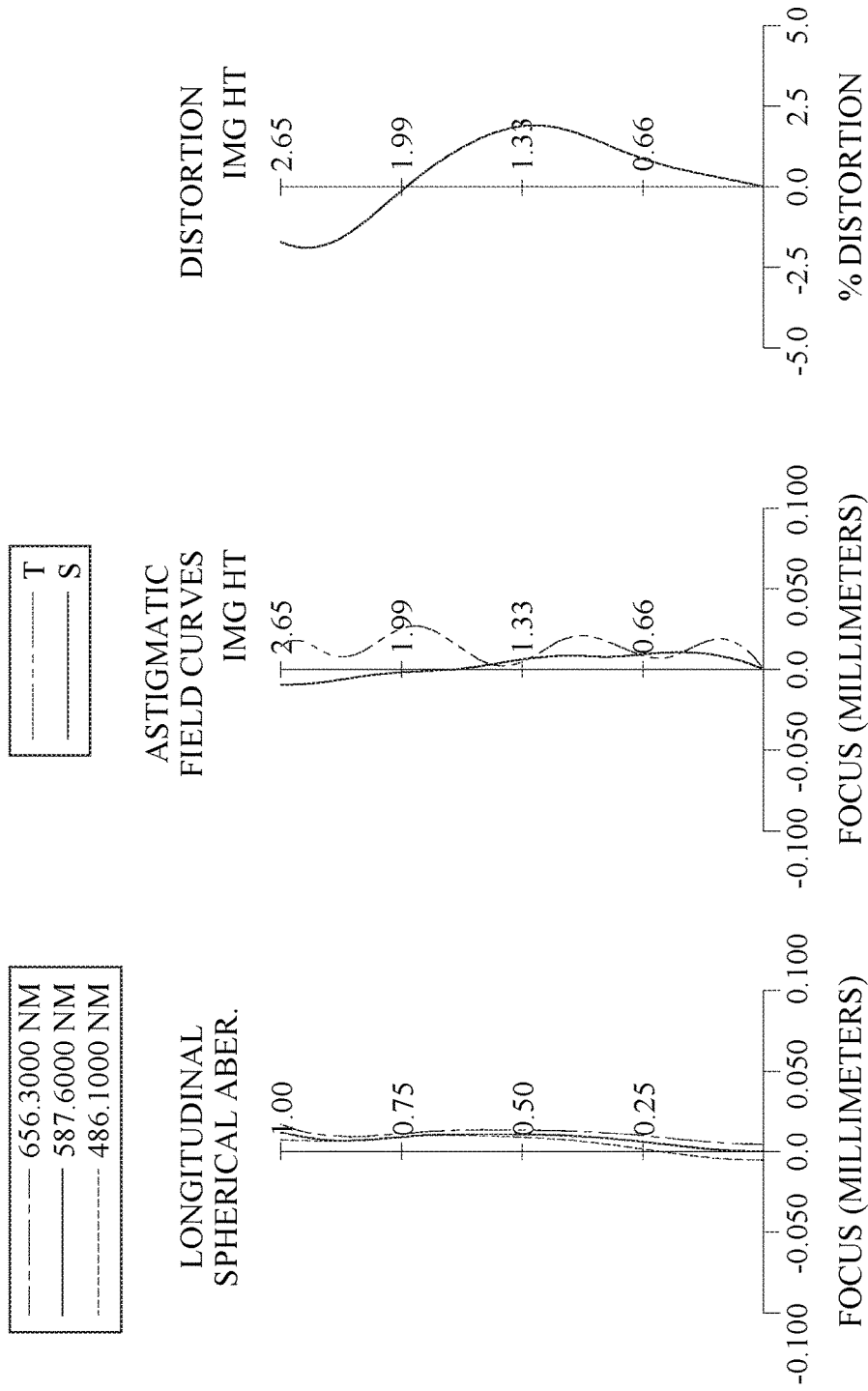
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens system (its reference numeral is omitted) of the present disclosure and an image sensor 980. The photographing optical lens system includes five lens elements which are, in order from an object side to an image side, a first lens element 910, an aperture stop 900, a second lens element 920, a third lens element 930, a stop 901, a fourth lens element 940, a fifth lens element 950, an IR-cut filter 960 and an image surface 970. The photographing optical lens system includes five lens elements (910, 920, 930, 940, 950) with no additional lens element disposed between the first lens element 910 and the fifth lens element 950.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric. The image-side surface 932 of the third lens element 930 has at least one convex critical point in an off-axial region thereof.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axial region thereof.

The IR-cut filter 960 is made of glass material and located between the fifth lens element 950 and the image surface 970, and will not affect the focal length of the photographing optical lens system. The image sensor 980 is disposed on or near the image surface 970 of the photographing optical lens system.

The detailed optical data of the 9th embodiment are shown in Table 17 and the aspheric surface data are shown in Table 18 below.

TABLE 17

9th Embodiment
f = 2.88 mm, Fno = 2.25, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.807 | (ASP) | 0.261 | Plastic | 1.544 | 55.9 | 6.91 |
| 2 | | 3.301 | (ASP) | 0.118 | | | | |
| 3 | Ape. Stop | Plano | | 0.059 | | | | |
| 4 | Lens 2 | 3.956 | (ASP) | 0.442 | Plastic | 1.544 | 55.9 | 3.08 |
| 5 | | −2.791 | (ASP) | 0.175 | | | | |
| 6 | Lens 3 | −3.641 | (ASP) | 0.230 | Plastic | 1.660 | 20.4 | −3.53 |

TABLE 17-continued

9th Embodiment
f = 2.88 mm, Fno = 2.25, HFOV = 43.1 deg.

| Surface # | | Curvature Radius | | Thickness | Material | Index | Abbe # | Focal Length |
|---|---|---|---|---|---|---|---|---|
| 7 | | 6.616 | (ASP) | −0.049 | | | | |
| 8 | Stop | Plano | | 0.318 | | | | |
| 9 | Lens 4 | 64.311 | (ASP) | 1.044 | Plastic | 1.582 | 30.2 | 1.06 |
| 10 | | −0.618 | (ASP) | 0.066 | | | | |
| 11 | Lens 5 | −16.088 | (ASP) | 0.300 | Plastic | 1.584 | 28.2 | −0.92 |
| 12 | | 0.557 | (ASP) | 0.600 | | | | |
| 13 | IR-cut filter | Plano | | 0.145 | Glass | 1.517 | 64.2 | — |
| 14 | | Plano | | 0.281 | | | | |
| 15 | Image | Plano | | — | | | | |

Note:
Reference wavelength is 587.6 nm (d-line).
An effective radius of the stop 901 (Surface 8) is 0.950 mm.

TABLE 18

Aspheric Coefficients

| Surface # | | | | | |
|---|---|---|---|---|---|
| | 1 | 2 | 4 | 5 | 6 |
| k = | 8.7507E−01 | −2.8496E+00 | −4.8135E−06 | 1.3038E+00 | 1.2090E+01 |
| A4 = | −1.2670E−01 | −1.8431E−01 | −1.4351E−01 | −4.2124E−01 | −1.0106E+00 |
| A6 = | −3.8589E−01 | −2.6693E−01 | 2.1113E−01 | 6.0858E−01 | 2.3055E+00 |
| A8 = | 1.2669E+00 | 6.8168E−01 | −2.0810E+00 | −1.2497E+00 | −4.8352E+00 |
| A10 = | −3.9972E+00 | −1.2712E+00 | 8.8321E+00 | 2.0265E+00 | 1.0734E+01 |
| A12 = | 5.6506E+00 | 1.8121E+00 | −1.5399E+01 | −2.1556E+00 | −1.7826E+01 |
| A14 = | −2.7028E+00 | — | 9.7139E+00 | — | 1.0565E+01 |

| Surface # | | | | | |
|---|---|---|---|---|---|
| | 7 | 9 | 10 | 11 | 12 |
| k = | −3.6637E+01 | −5.9003E+01 | −5.5101E+00 | −9.0000E+01 | −5.8795E+00 |
| A4 = | −7.5379E−01 | −1.0061E−01 | −3.9752E−01 | −4.0610E−01 | −1.9759E−01 |
| A6 = | 1.6908E+00 | −2.3579E−01 | 9.6600E−01 | 4.5167E−01 | 1.2443E−01 |
| A8 = | −2.5761E+00 | 9.7680E−01 | −2.1655E+00 | −1.1922E+00 | −5.8662E−02 |
| A10 = | 2.9417E+00 | −2.4889E+00 | 2.8381E+00 | 1.8039E+00 | 1.8851E−02 |
| A12 = | −2.7161E+00 | 3.6754E+00 | −2.1138E+00 | −1.4212E+00 | −4.1267E−03 |
| A14 = | 1.1792E+00 | −2.9079E+00 | 8.2347E−01 | 5.6283E−01 | 5.4799E−04 |
| A16 = | — | 9.2452E−01 | −1.2746E−01 | −8.8978E−02 | −3.3034E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.88 | CT3/CT2 | 0.52 |
| Fno | 2.25 | ImgH/f | 0.92 |
| HFOV [deg.] | 43.1 | (R3 + R4)/(R3 − R4) | 0.17 |
| Nv12 − Nv345 | −0.06 | (R5 + R6)/(R5 − R6) | −0.29 |
| (V1 + V2) − (V3 + V4 + V5) | 33.0 | f1/f2 | 2.24 |
| V3 + V4 + V5 | 78.80 | f2/f3 | −0.87 |
| V4 | 30.2 | (f/f4) + |f/f5| | 5.85 |
| T12/T23 | 1.01 | — | — |

10th Embodiment

Figure 19:
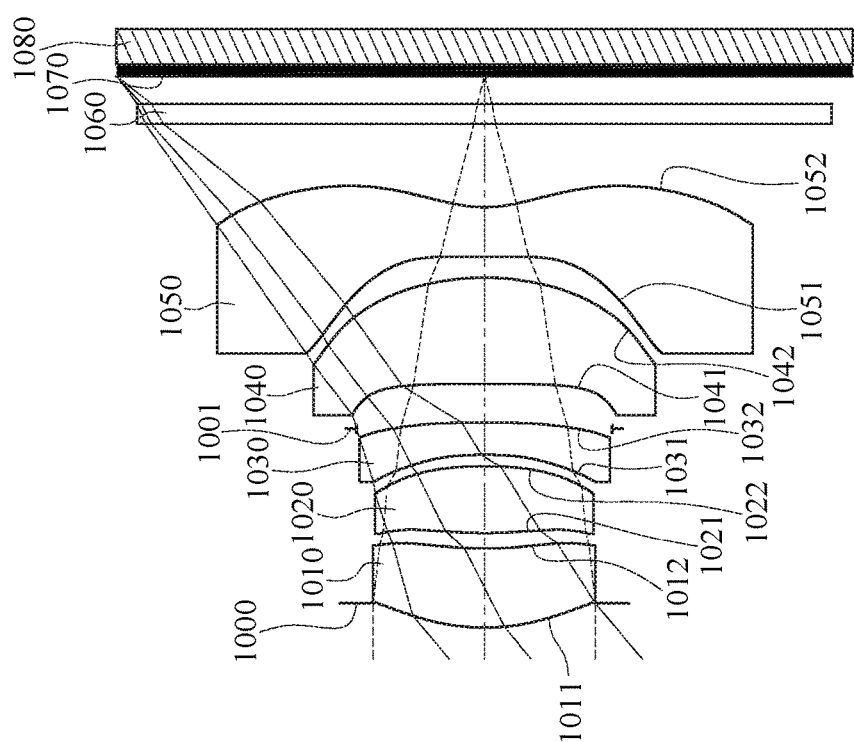
FIG. 19 is a schematic view of an image capturing unit according to the 10th embodiment of the present disclosure.
Figure 20:
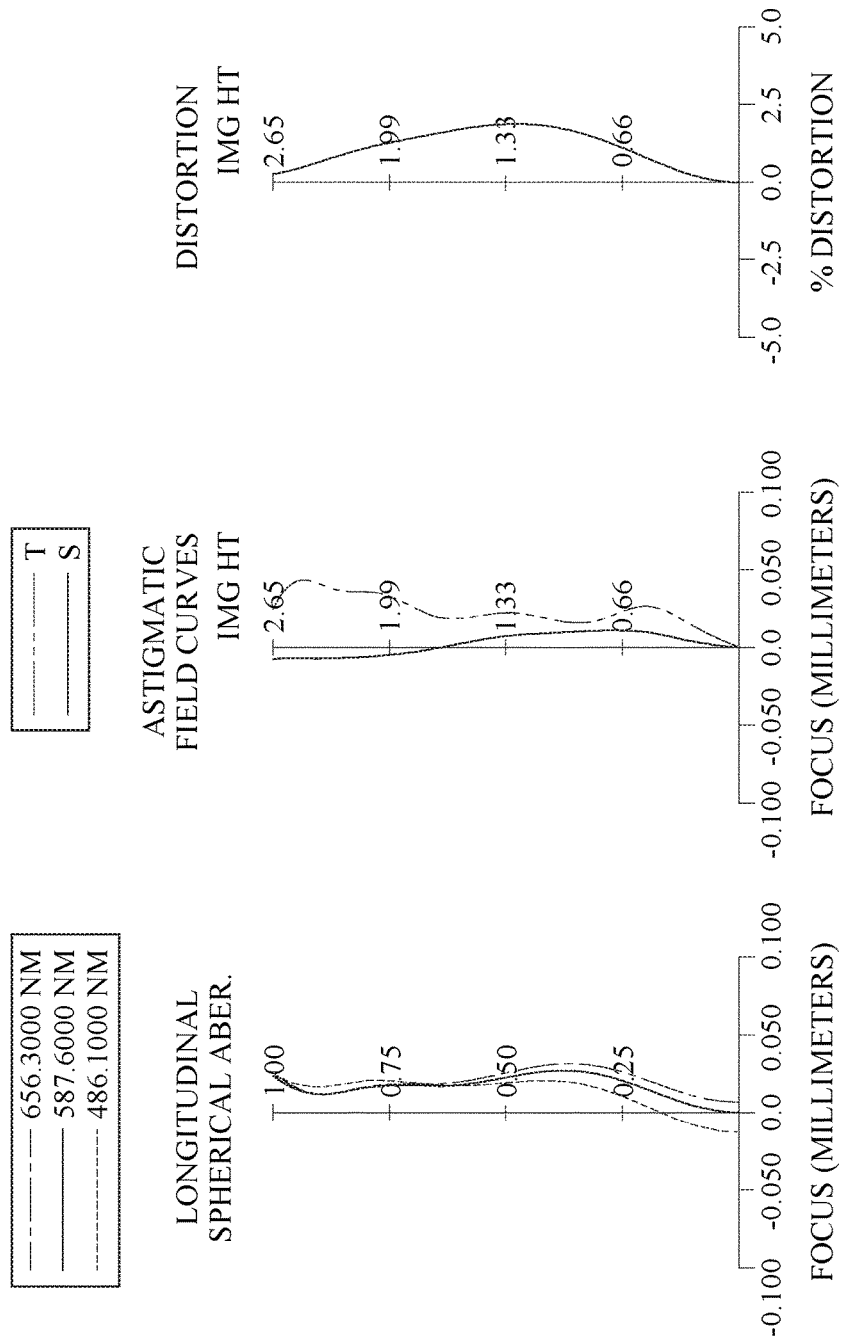
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens system (its reference numeral is omitted) of the present disclosure and an image sensor 1080. The photographing optical lens system includes five lens elements which are, in order from an object side to an image side, an aperture stop 1000, a first lens element 1010, a second lens element 1020, a third lens element 1030, a stop 1001, a fourth lens element 1040, a fifth lens element 1050, an IR-cut filter 1060 and an image surface 1070. The photographing optical lens system includes five lens elements (1010, 1020, 1030, 1040, 1050) with no additional lens element disposed between the first lens element 1010 and the fifth lens element 1050.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex critical point in an off-axial region thereof.

The IR-cut filter 1060 is made of glass material and located between the fifth lens element 1050 and the image surface 1070, and will not affect the focal length of the photographing optical lens system. The image sensor 1080 is disposed on or near the image surface 1070 of the photographing optical lens system.

The detailed optical data of the 10th embodiment are shown in Table 19 and the aspheric surface data are shown in Table 20 below.

TABLE 19

10th Embodiment
f = 3.12 mm, Fno = 1.95, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.174 | | | | |
| 2 | Lens 1 | 1.550 | (ASP) | 0.569 | Plastic | 1.544 | 56.0 | 5.77 |
| 3 | | 2.668 | (ASP) | 0.115 | | | | |
| 4 | Lens 2 | 3.455 | (ASP) | 0.481 | Plastic | 1.544 | 56.0 | 3.26 |
| 5 | | −3.458 | (ASP) | 0.082 | | | | |
| 6 | Lens 3 | −3.321 | (ASP) | 0.231 | Plastic | 1.671 | 19.3 | −5.13 |
| 7 | | −100.000 | (ASP) | −0.044 | | | | |
| 8 | Stop | Plano | | 0.322 | | | | |
| 9 | Lens 4 | 56.284 | (ASP) | 0.767 | Plastic | 1.633 | 23.4 | 2.53 |
| 10 | | −1.642 | (ASP) | 0.147 | | | | |
| 11 | Lens 5 | 6.792 | (ASP) | 0.363 | Plastic | 1.603 | 28.5 | −1.79 |
| 12 | | 0.912 | (ASP) | 0.600 | | | | |
| 13 | IR-cut filter | Plano | | 0.145 | Glass | 1.517 | 64.2 | — |
| 14 | | Plano | | 0.201 | | | | |
| 15 | Image | Plano | | — | | | | |

Note:
Reference wavelength is 587.6 nm (d-line).
An effective radius of the stop 1001 (Surface 8) is 0.920 mm.

TABLE 20

Aspheric Coefficients

| Surface # | | | | |
|---|---|---|---|---|
| 2 | 3 | 4 | 5 | 6 |
| k = 1.7248E+00 | −2.8496E+00 | −4.9881E−06 | 1.3038E+00 | 1.2090E+01 |
| A4 = −1.1793E−01 | −1.1195E−01 | −1.4103E−01 | −5.9051E−01 | −8.9503E−01 |
| A6 = 4.9720E−02 | −3.5672E−01 | −3.0157E−01 | 1.1824E+00 | 2.6658E+00 |
| A8 = −5.9165E−01 | 4.4756E−01 | 2.0672E−01 | −1.6096E+00 | −3.7009E+00 |
| A10 = 1.0072E+00 | −1.0106E+00 | −1.5440E+00 | 9.5199E−01 | 3.0181E+00 |
| A12 = −1.0589E+00 | 1.1408E+00 | 3.5378E+00 | −1.6358E−01 | −2.5089E+00 |
| A14 = 2.8286E−01 | — | −1.8582E+00 | — | 1.5939E+00 |

| Surface # | | | | |
|---|---|---|---|---|
| 7 | 9 | 10 | 11 | 12 |
| k = −3.6637E+01 | −5.9003E+01 | −5.5101E+00 | −8.2139E+01 | −5.8795E+00 |
| A4 = −5.4661E−01 | −1.0764E−01 | 9.8234E−02 | −5.9732E−01 | −2.7345E−01 |
| A6 = 1.3805E+00 | 1.0212E−01 | −5.2315E−01 | 5.4083E−01 | 1.8544E−01 |
| A8 = −1.8577E+00 | −1.3544E+00 | 5.3408E−01 | −1.5172E+00 | −7.6460E−02 |

TABLE 20-continued

| Aspheric Coefficients | | | | | |
|---|---|---|---|---|---|
| A10 = | 1.4061E+00 | 4.1620E+00 | −3.2650E−01 | 2.7200E+00 | 1.8371E−02 |
| A12 = | −9.6480E−01 | −6.5868E+00 | 2.4696E−01 | −2.3865E+00 | −2.2332E−03 |
| A14 = | 4.6601E−01 | 5.2298E+00 | −2.0510E−01 | 1.0037E+00 | 5.3658E−05 |
| A16 = | — | −1.8236E+00 | 6.6802E−02 | −1.6129E−01 | 9.5359E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.12 | CT3/CT2 | 0.48 |
| Fno | 1.95 | ImgH/f | 0.85 |
| HFOV [deg.] | 40.1 | (R3 + R4)/(R3 − R4) | −0.00039 |
| Nv12 − Nv345 | −0.09 | (R5 + R6)/(R5 − R6) | −1.07 |
| (V1 + V2) − (V3 + V4 + V5) | 33.0 | f1/f2 | 1.77 |
| V3 + V4 + V5 | 78.80 | f2/f3 | −0.64 |
| V4 | 30.2 | (f/f4) + |f/f5| | 2.98 |
| T12/T23 | 1.40 | — | — |

11th Embodiment

Figure 21:
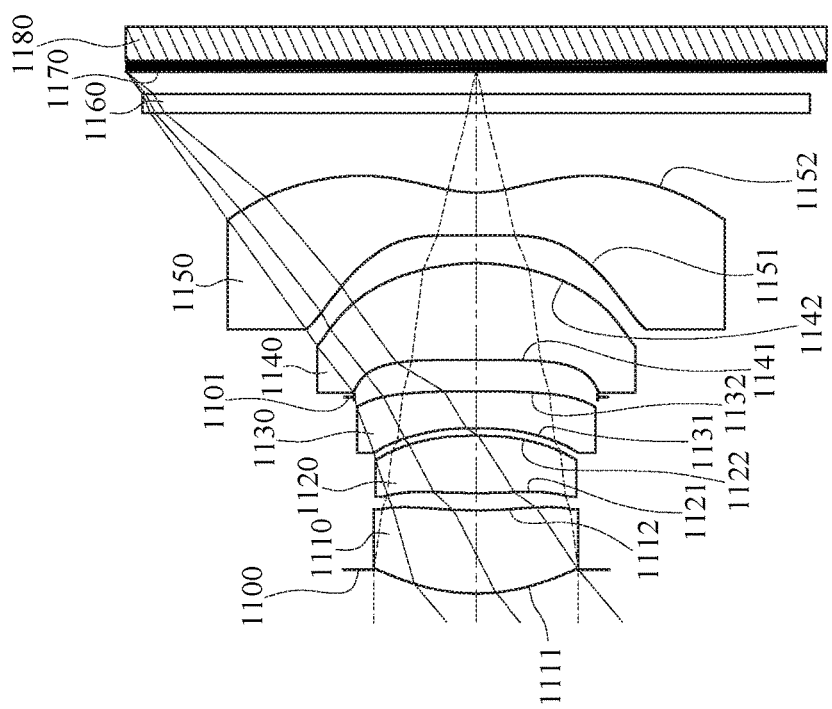
FIG. 21 is a schematic view of an image capturing unit according to the 11th embodiment of the present disclosure.
Figure 22:
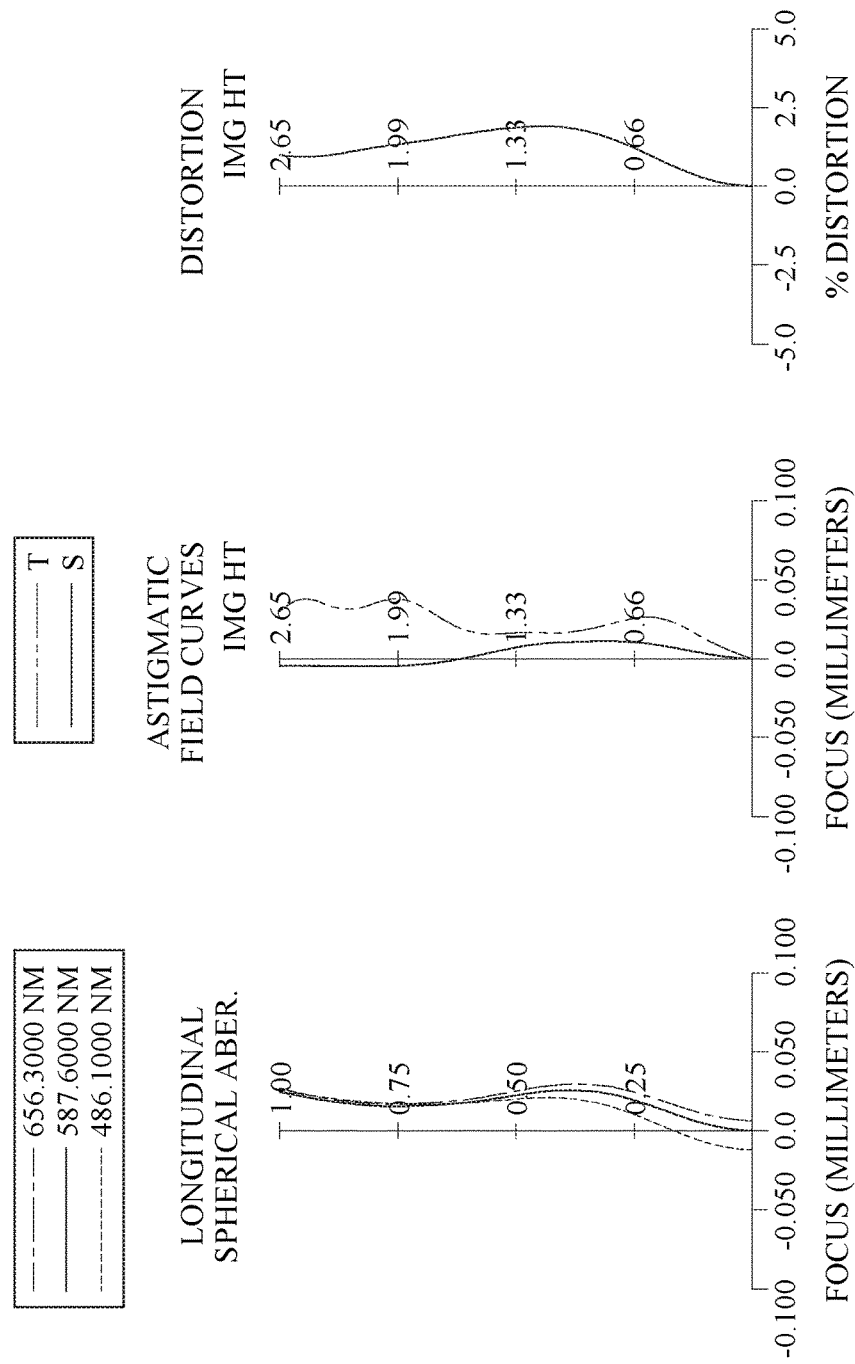
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the photographing optical lens system (its reference numeral is omitted) of the present disclosure and an image sensor 1180. The photographing optical lens system includes five lens elements which are, in order from an object side to an image side, an aperture stop 1100, a first lens element 1110, a second lens element 1120, a third lens element 1130, a stop 1101, a fourth lens element 1140, a fifth lens element 1150, an IR-cut filter 1160 and an image surface 1170. The photographing optical lens system includes five lens elements (1110, 1120, 1130, 1140, 1150) with no additional lens element disposed between the first lens element 1110 and the fifth lens element 1150.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with positive refractive power has an object-side surface 1121 being convex in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with negative refractive power has an object-side surface 1131 being concave in a paraxial region thereof and an image-side surface 1132 being concave in a paraxial region thereof. The third lens element 1130 is made of plastic material and has the object-side surface 1131 and the image-side surface 1132 being both aspheric. The image-side surface 1132 of the third lens element 1130 has at least one convex critical point in an off-axial region thereof.

The fourth lens element 1140 with positive refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least one convex critical point in an off-axial region thereof.

The IR-cut filter 1160 is made of glass material and located between the fifth lens element 1150 and the image surface 1170, and will not affect the focal length of the photographing optical lens system. The image sensor 1180 is disposed on or near the image surface 1170 of the photographing optical lens system.

The detailed optical data of the 11th embodiment are shown in Table 21 and the aspheric surface data are shown in Table 22 below.

TABLE 21

11th Embodiment
f = 3.10 mm, Fno = 2.00, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.180 | | | | |
| 2 | Lens 1 | 1.500 | (ASP) | 0.634 | Plastic | 1.545 | 56.1 | 4.29 |
| 3 | | 3.561 | (ASP) | 0.131 | | | | |
| 4 | Lens 2 | 6.044 | (ASP) | 0.433 | Plastic | 1.545 | 56.1 | 3.75 |

TABLE 21-continued

11th Embodiment
f = 3.10 mm, Fno = 2.00, HFOV = 40.1 deg.

| Surface # | | Curvature Radius | | Thickness | Material | Index | Abbe # | Focal Length |
|---|---|---|---|---|---|---|---|---|
| 5 | | −3.006 | (ASP) | 0.057 | | | | |
| 6 | Lens 3 | −3.350 | (ASP) | 0.277 | Plastic | 1.671 | 19.3 | −4.26 |
| 7 | | 20.133 | (ASP) | −0.043 | | | | |
| 8 | Stop | Plano | | 0.282 | | | | |
| 9 | Lens 4 | −100.728 | (ASP) | 0.732 | Plastic | 1.671 | 19.3 | 2.29 |
| 10 | | −1.514 | (ASP) | 0.209 | | | | |
| 11 | Lens 5 | 10.789 | (ASP) | 0.329 | Plastic | 1.650 | 21.5 | −1.67 |
| 12 | | 0.975 | (ASP) | 0.600 | | | | |
| 13 | IR-cut filter | Plano | | 0.145 | Glass | 1.517 | 64.2 | — |
| 14 | | Plano | | 0.169 | | | | |
| 15 | Image | Plano | | — | | | | |

Note:
Reference wavelength is 587.6 nm (d-line).
An effective radius of the stop 1101 (Surface 8) is 0.920 mm.

TABLE 22

Aspheric Coefficients

| Surface # | | | | | |
|---|---|---|---|---|---|
| | 2 | 3 | 4 | 5 | 6 |
| k = | 1.6270E+00 | −2.8496E+00 | −4.9850E−06 | 1.3038E+00 | 1.2090E+01 |
| A4 = | −1.1278E−01 | −1.2226E−01 | −1.5592E−01 | −7.6682E−01 | −1.0242E+00 |
| A6 = | 1.0940E−01 | −2.5454E−01 | −3.8212E−01 | 2.5487E+00 | 4.0490E+00 |
| A8 = | −8.5704E−01 | 7.9442E−02 | 6.9917E−01 | −5.0747E+00 | −8.4335E+00 |
| A10 = | 1.6367E+00 | −4.2789E−01 | −3.1224E+00 | 4.8374E+00 | 1.0424E+01 |
| A12 = | −1.7919E+00 | 7.3910E−01 | 6.2153E+00 | −1.8313E+00 | −8.5557E+00 |
| A14 = | 5.6622E−01 | — | −3.5433E+00 | — | 3.6499E+00 |

| Surface # | | | | | |
|---|---|---|---|---|---|
| | 7 | 9 | 10 | 11 | 12 |
| k = | −3.6637E+01 | −5.9003E+01 | −5.5101E+00 | −6.8081E+01 | −5.8795E+00 |
| A4 = | −5.2542E−01 | −9.2271E−02 | 8.5484E−02 | −5.5127E−01 | −3.3875E−01 |
| A6 = | 1.3223E+00 | −1.8533E−01 | −6.9916E−01 | 7.6653E−02 | 2.5677E−01 |
| A8 = | −2.0652E+00 | −1.3845E−01 | 1.2157E+00 | −2.5579E−01 | −1.2188E−01 |
| A10 = | 1.8080E+00 | 1.2442E+00 | −1.5057E+00 | 1.0503E+00 | 3.6024E−02 |
| A12 = | −1.2168E+00 | −2.7756E+00 | 1.3402E+00 | −1.1922E+00 | −6.3679E−03 |
| A14 = | 4.6682E−01 | 2.7320E+00 | −7.4017E−01 | 5.6476E−01 | 5.8239E−04 |
| A16 = | — | −1.3054E+00 | 1.7625E−01 | −9.6746E−02 | −1.7861E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.10 | CT3/CT2 | 0.64 |
| Fno | 2.00 | ImgH/f | 0.86 |
| HFOV [deg.] | 40.1 | (R3 + R4)/(R3 − R4) | 0.34 |
| Nv12 − Nv345 | −0.12 | (R5 + R6)/(R5 − R6) | −0.71 |
| (V1 + V2) − (V3 + V4 + V5) | 52.1 | f1/f2 | 1.14 |
| V3 + V4 + V5 | 60.10 | f2/f3 | −0.88 |
| V4 | 19.3 | (f/f4) + |f/f5| | 3.21 |
| T12/T23 | 2.30 | — | — |

12th Embodiment

Figure 23:
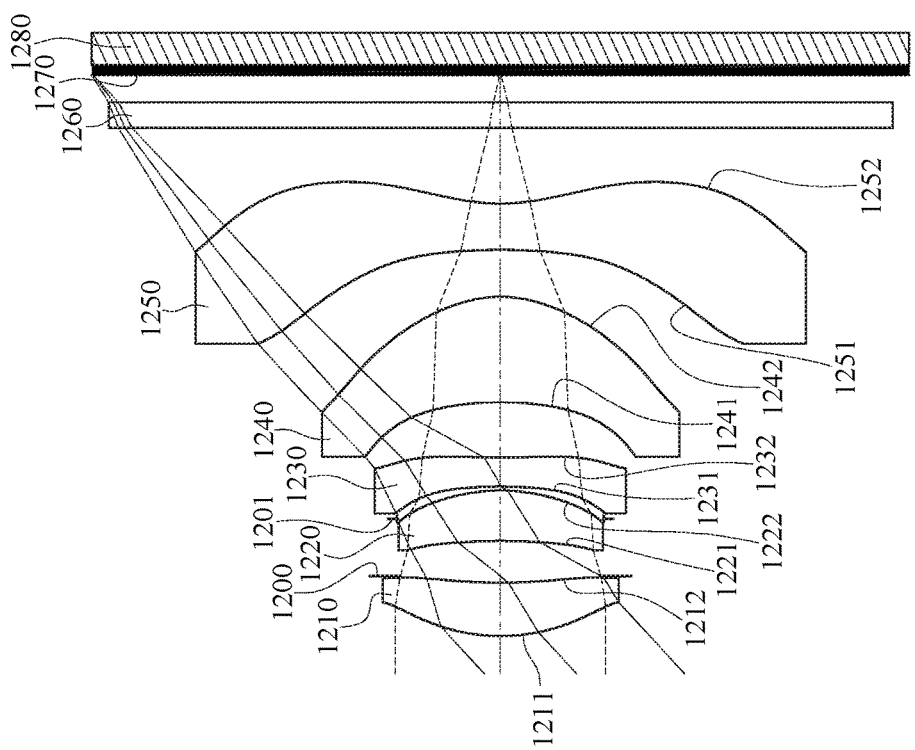
FIG. 23 is a schematic view of an image capturing unit according to the 12th embodiment of the present disclosure.
Figure 24:
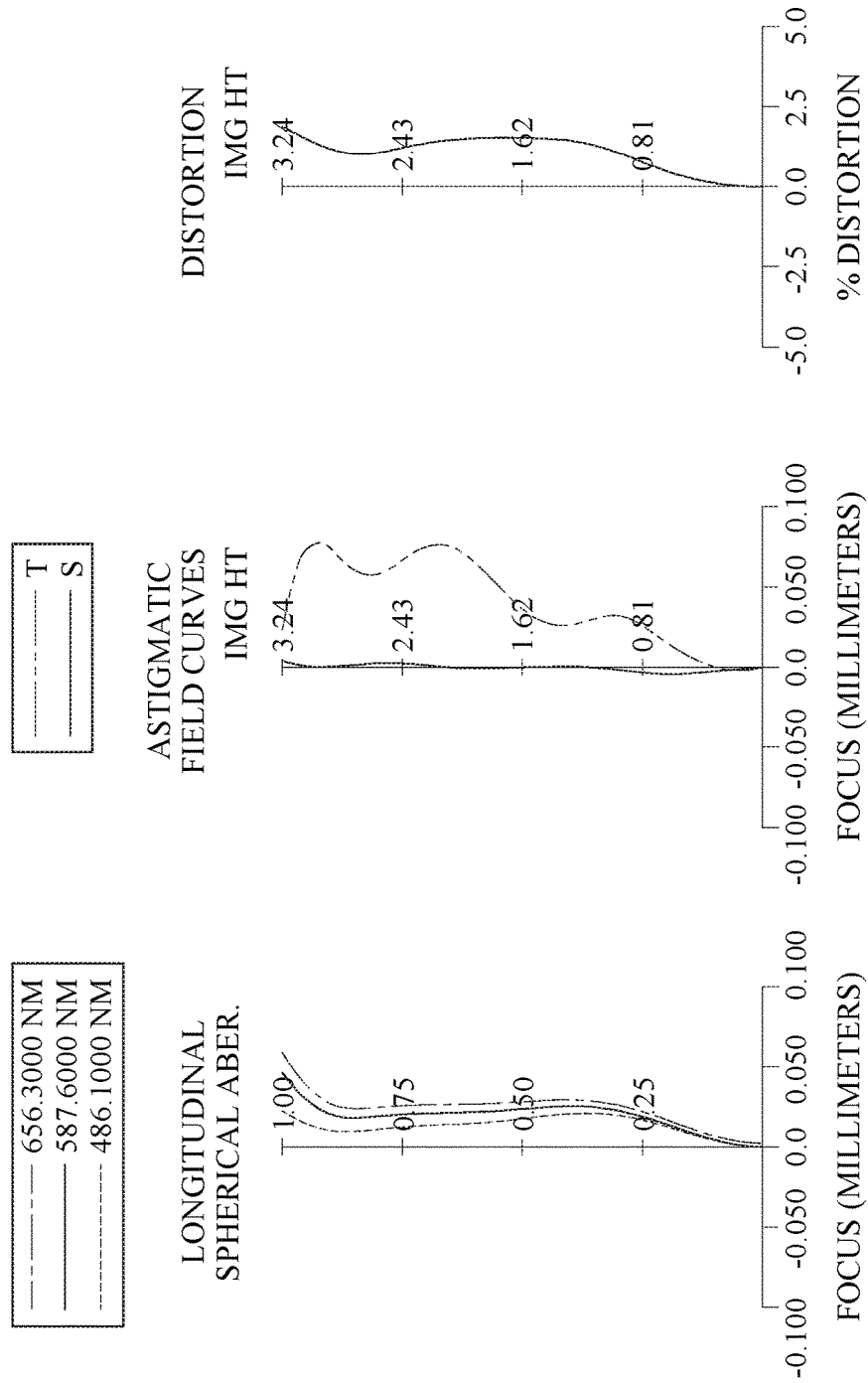
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the photographing optical lens system (its reference numeral is omitted) of the present disclosure and an image sensor 1280. The photographing optical lens system includes five lens elements which are, in order from an object side to an image side, a first lens element 1210, an aperture stop 1200, a second lens element 1220, a stop 1201, a third lens element 1230, a fourth lens element 1240, a fifth lens element 1250, an IR-cut filter 1260 and an image surface 1270. The photographing optical lens system includes five lens elements (1210, 1220, 1230, 1240, 1250) with no additional lens element disposed between the first lens element 1210 and the fifth lens element 1250.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric.

The second lens element 1220 with positive refractive power has an object-side surface 1221 being concave in a paraxial region thereof and an image-side surface 1222 being convex in a paraxial region thereof. The second lens element 1220 is made of plastic material and has the object-side surface 1221 and the image-side surface 1222 being both aspheric.

The third lens element 1230 with negative refractive power has an object-side surface 1231 being concave in a paraxial region thereof and an image-side surface 1232 being concave in a paraxial region thereof. The third lens element 1230 is made of plastic material and has the object-side surface 1231 and the image-side surface 1232 being both aspheric. The image-side surface 1232 of the third lens element 1230 has at least one convex critical point in an off-axial region thereof.

The fourth lens element 1240 with positive refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with negative refractive power has an object-side surface 1251 being concave in a paraxial region thereof and an image-side surface 1252 being concave in a paraxial region thereof. The fifth lens element 1250 is made of plastic material and has the object-side surface 1251 and the image-side surface 1252 being both aspheric. The image-side surface 1252 of the fifth lens element 1250 has at least one convex critical point in an off-axial region thereof.

The IR-cut filter 1260 is made of glass material and located between the fifth lens element 1250 and the image surface 1270, and will not affect the focal length of the photographing optical lens system. The image sensor 1280 is disposed on or near the image surface 1270 of the photographing optical lens system.

The detailed optical data of the 12th embodiment are shown in Table 23 and the aspheric surface data are shown in Table 24 below.

TABLE 23

12th Embodiment
f = 3.43 mm, Fno = 2.05, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.508 | (ASP) | 0.425 | Plastic | 1.545 | 56.1 | 3.89 |
| 2 | | 4.699 | (ASP) | 0.051 | | | | |
| 3 | Ape. Stop | Plano | | 0.279 | | | | |
| 4 | Lens 2 | −5.242 | (ASP) | 0.402 | Plastic | 1.544 | 56.0 | 3.21 |
| 5 | | −1.346 | (ASP) | −0.227 | | | | |
| 6 | Stop | Plano | | 0.257 | | | | |
| 7 | Lens 3 | −3.932 | (ASP) | 0.230 | Plastic | 1.660 | 20.4 | −3.23 |
| 8 | | 4.778 | (ASP) | 0.441 | | | | |
| 9 | Lens 4 | −2.595 | (ASP) | 0.843 | Plastic | 1.614 | 26.0 | 2.13 |
| 10 | | −0.978 | (ASP) | 0.373 | | | | |
| 11 | Lens 5 | −4.095 | (ASP) | 0.367 | Plastic | 1.614 | 26.0 | −1.80 |
| 12 | | 1.564 | (ASP) | 0.600 | | | | |
| 13 | IR-cut filter | Plano | | 0.210 | Glass | 1.517 | 64.2 | — |
| 14 | | Plano | | 0.214 | | | | |
| 15 | Image | Plano | | — | | | | |

Note:
Reference wavelength is 587.6 nm (d-line).
An effective radius of the stop 1201 (Surface 6) is 0.820 mm.

TABLE 24

Aspheric Coefficients

| Surface # | 1 | 2 | 4 | 5 | 7 |
|---|---|---|---|---|---|
| k = | 9.9552E−01 | −2.2683E+01 | 8.1875E+00 | −3.1756E+00 | −1.3560E+01 |
| A4 = | −6.8571E−02 | 7.3661E−03 | −9.9781E−03 | 2.3684E−01 | −1.2656E−01 |
| A6 = | 1.7877E−01 | 7.9479E−03 | −5.6598E−02 | −1.2480E+00 | −6.4076E−01 |
| A8 = | −8.5134E−01 | −4.2300E−01 | 2.1804E−02 | 2.5246E+00 | 1.2979E+00 |
| A10 = | 1.5787E+00 | 1.0808E+00 | −5.1405E−02 | −3.5896E+00 | −1.7033E+00 |
| A12 = | −1.5591E+00 | −1.5928E+00 | 9.9847E−01 | 2.9988E+00 | 1.3054E+00 |
| A14 = | 5.0654E−01 | 8.7678E−01 | −7.0354E−01 | −1.1750E+00 | −4.0931E−01 |

| Surface # | 8 | 9 | 10 | 11 | 12 |
|---|---|---|---|---|---|
| k = | −2.0942E+00 | 8.8727E−01 | −7.9216E−01 | −1.6214E+00 | −1.7177E+00 |
| A4 = | −3.7809E−01 | −5.8146E−02 | 1.9872E−01 | 9.4978E−02 | −2.0712E−01 |

TABLE 24-continued

| Aspheric Coefficients | | | | | |
|---|---|---|---|---|---|
| A6 = | 4.6370E−01 | −2.5240E−02 | −1.6609E−01 | −3.2877E−01 | 9.2478E−02 |
| A8 = | −8.5211E−01 | 2.7419E−02 | −9.4639E−03 | 3.1783E−01 | −2.9082E−02 |
| A10 = | 1.1380E+00 | −4.0284E−01 | 1.5877E−01 | −1.6013E−01 | 6.2639E−03 |
| A12 = | −8.5921E−01 | 7.1268E−01 | −1.5484E−01 | 4.4690E−02 | −9.2236E−04 |
| A14 = | 2.9773E−01 | −5.4293E−01 | 6.6089E−02 | −6.4793E−03 | 8.1823E−05 |
| A16 = | — | 1.5975E−01 | −1.0526E−02 | 3.8045E−04 | −3.1269E−06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 3.43 | CT3/CT2 | 0.57 |
| Fno | 2.05 | ImgH/f | 0.94 |
| HFOV [deg.] | 42.6 | (R3 + R4)/(R3 − R4) | 1.69 |
| Nv12 − Nv345 | −0.08 | (R5 + R6)/(R5 − R6) | −0.10 |
| (V1 + V2) − (V3 + V4 + V5) | 39.7 | f1/f2 | 1.21 |
| V3 + V4 + V5 | 72.40 | f2/f3 | −0.99 |
| V4 | 26.0 | (f/f4) + |f/f5| | 3.52 |
| T12/T23 | 11.00 | — | — |

13th Embodiment

Figure 26:
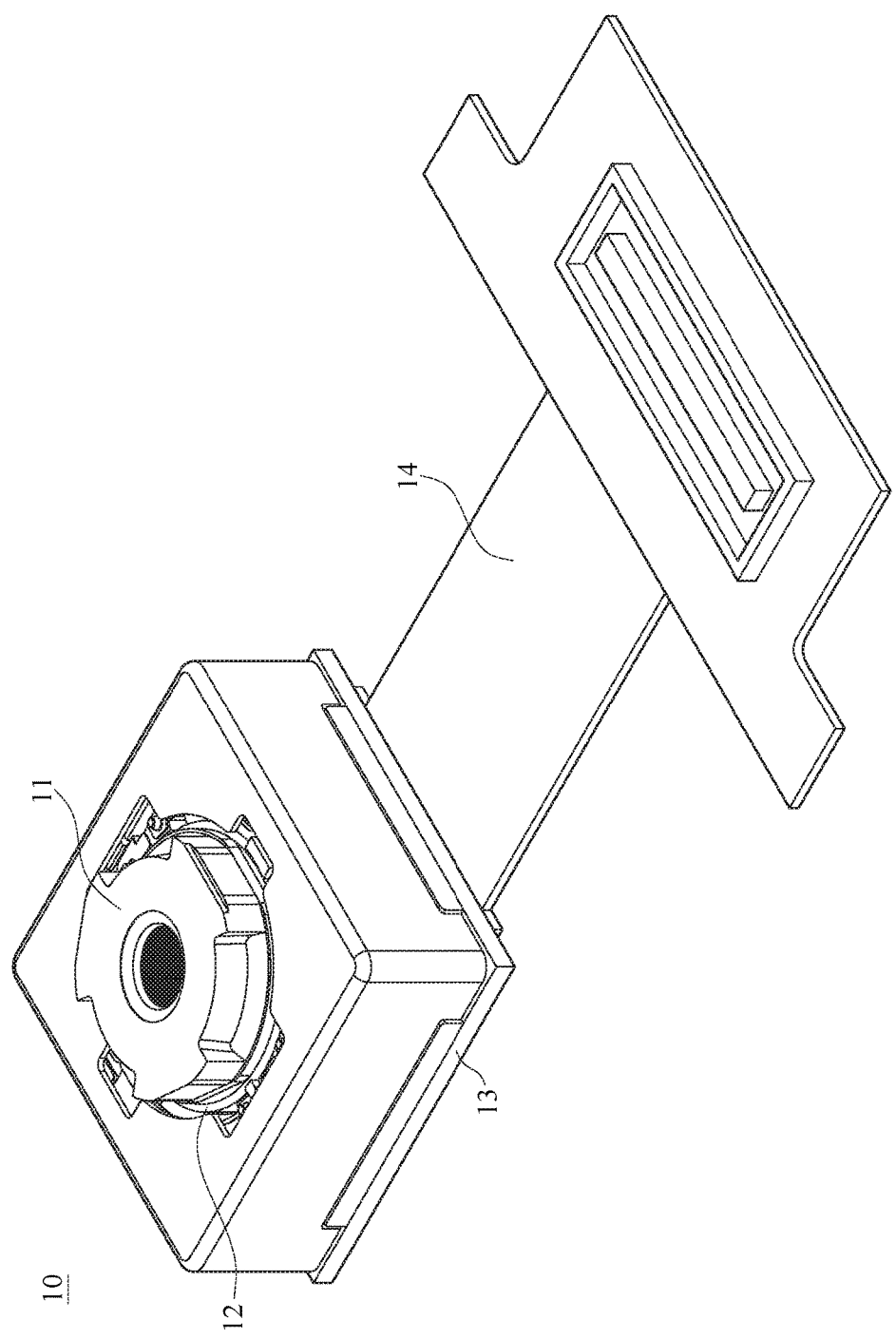
FIG. 26 is a perspective view of an image capturing unit according to the 13th embodiment of the present disclosure.

FIG. 26 is a perspective view of an image capturing unit according to the 13th embodiment of the present disclosure. In this embodiment, an image capturing unit 10 is a camera module including a lens unit 11, a driving device 12, an image sensor 13 and a cable 14. The lens unit 11 includes the photographing optical lens system disclosed in the first embodiment, a barrel and a holder member (their reference numerals are omitted) for holding the photographing optical lens system. The external light converges into the lens unit 11 of the image capturing unit 10 to generate an image, and the lens unit 11 along with the driving device 12 is utilized for image focusing on the image sensor 13. The image is digitally transmitted to an electronic component by the cable 14.

The driving device 12 can have auto focusing functionality, and the driving device 12 may include voice coil motors (VCM), micro electro-mechanical systems (MEMS), piezoelectric systems or shape memory alloys. The driving device 12 is favorable for the lens unit 11 to obtain a better imaging position, so that a clear image of the imaged object can be captured by the lens unit 11 with different object distances. The image sensor 13 (for example, CCD or CMOS) can be featured with high sensitivity to light and low noise, and can be disposed on the image surface of the photographing optical lens system to provide actual image quality.

14th Embodiment

Figure 27:
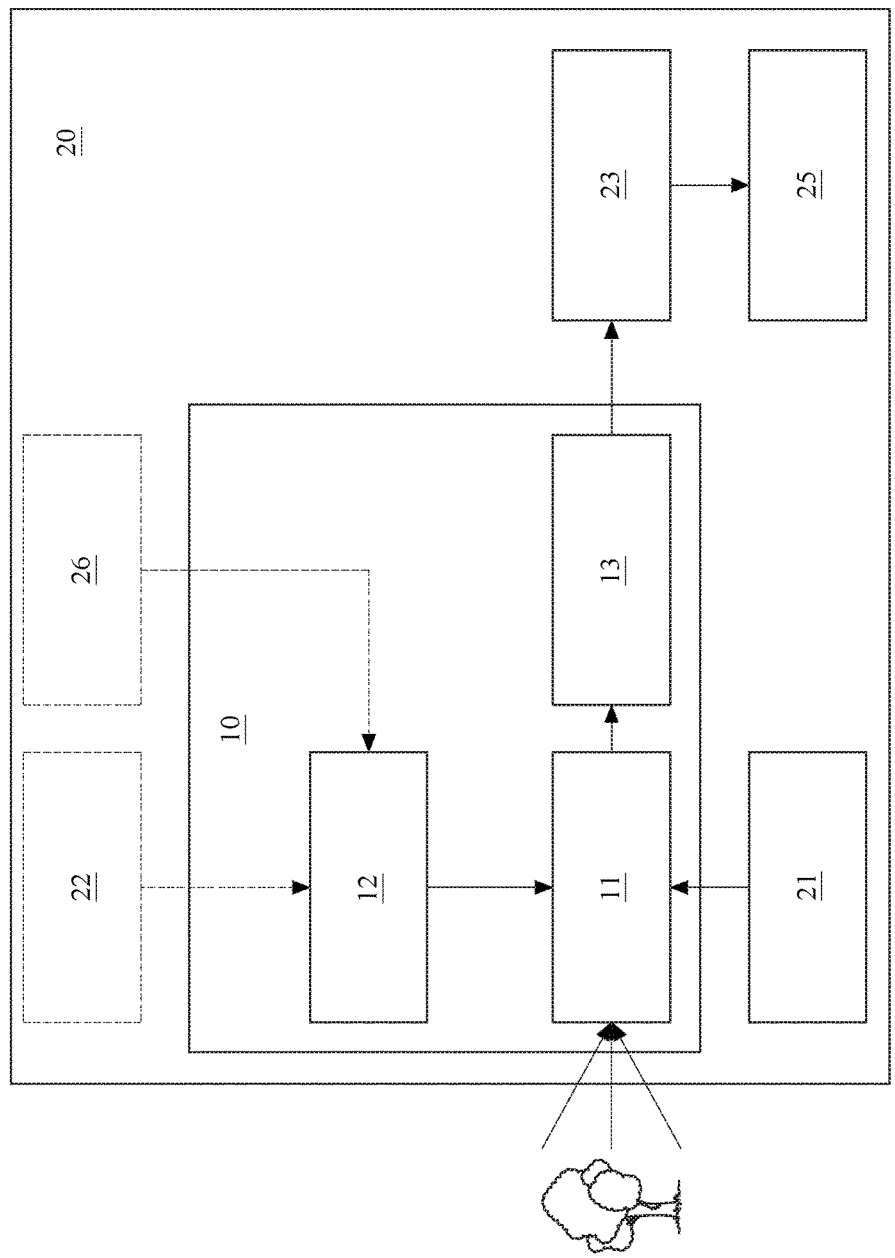
FIG. 27 is a schematic view of an electronic device according to the 14th embodiment of the present disclosure.
Figure 28:
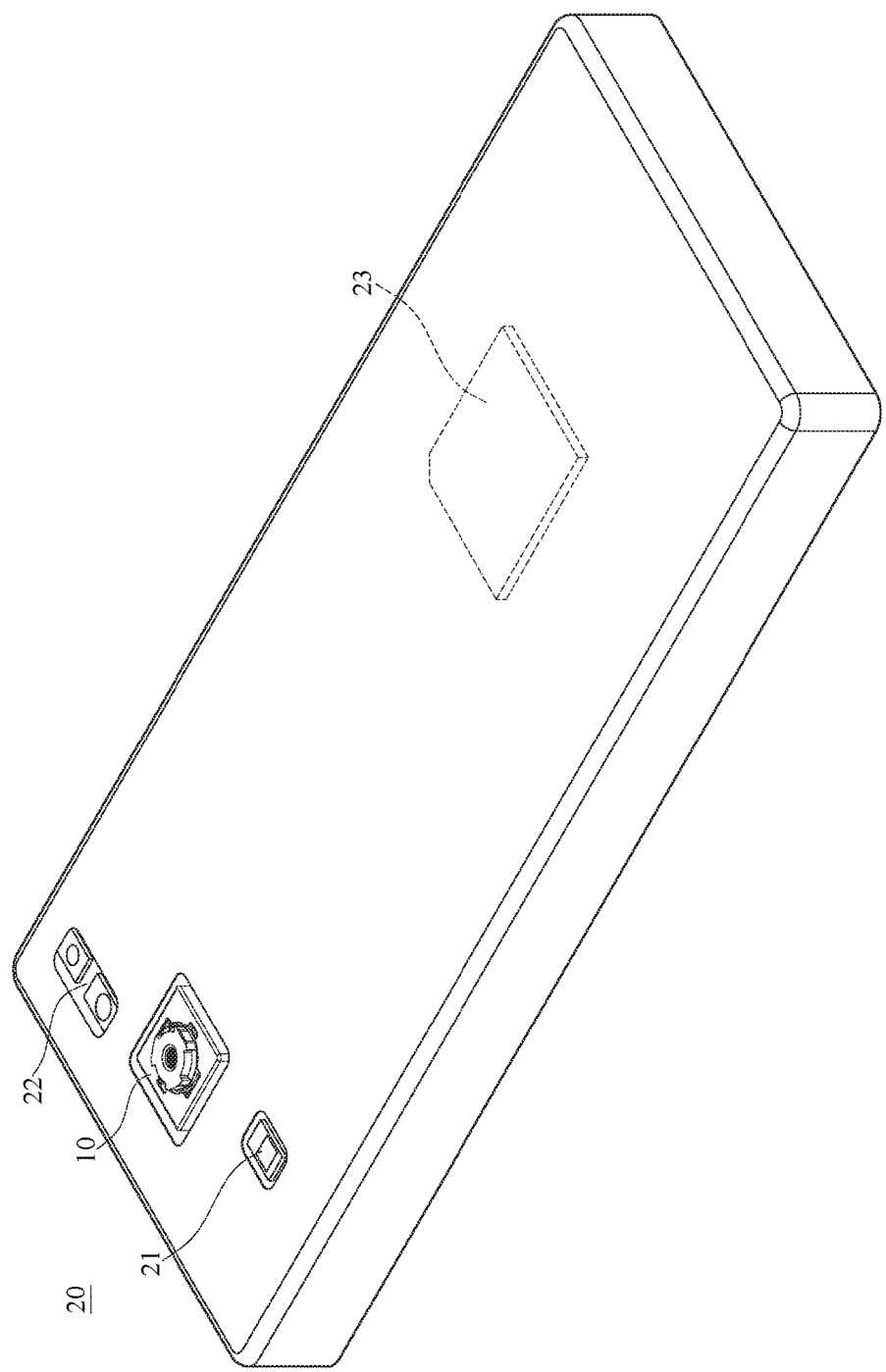
FIG. 28 is a perspective view of the electronic device in FIG. 27.
Figure 29:
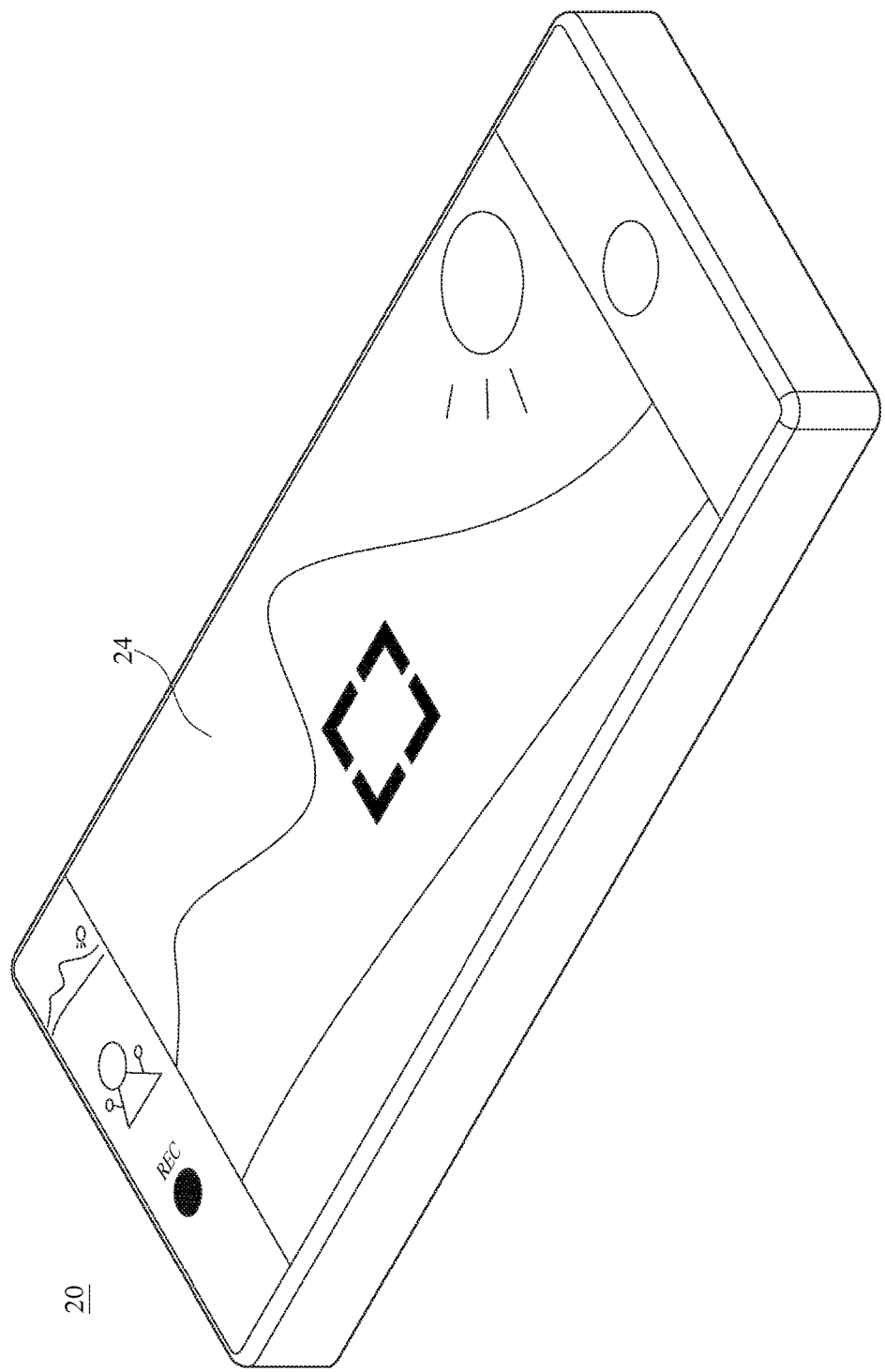
FIG. 29 is another perspective view of the electronic device in FIG. 27.

FIG. 27 is a schematic view of an electronic device according to the 14th embodiment of the present disclosure. FIG. 28 is a perspective view of the electronic device in FIG. 27. FIG. 29 is another perspective view of the electronic device in FIG. 27. In this embodiment, an electronic device 20 is a smartphone including the image capturing unit 10 disclosed in the eleventh embodiment, a flash module 21, a focus assist module 22, an image signal processor 23, an user interface 24, an image software processor 25 and a dynamic sensing element 26.

There can be a dynamic sensing element 26, such as an accelerometer, a gyroscope and a hall sensor, configured to work with the driving device 12, so that the driving device 12 can provide optical image stabilization (OIS). The driving device 12 working with the dynamic sensing element 26 is favorable for compensating for pan and tilt of the lens unit 11 to reduce blurring associated with motion during exposure. In some cases, the driving device 12 can be can be assisted by electronic image stabilization (EIS) with image processing software, thereby improving image quality while in motion or low-light condition.

When a user interacts with the user interface 24 to capture images, light converges into the image capturing unit 10 to generate image, and the flash module 21 is activated for light supplement. The focus assist module 22 detects the object distance of the imaged object to achieve fast image auto focus. The image signal processor 23 is configured to optimize the captured image to improve image quality. The light beam emitted from focus assist module 22 can be either infrared light or laser. The user interface 24 can be a touch screen or a shutter button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 is featured with good capability in aberration corrections and high image quality, and can be applied to 3D (three-dimensional) image capturing applications, in products such as digital cameras, mobile devices, digital tablets, wearable devices, smart televisions, multiple lens devices, network surveillance devices, motion sensing input devices, dashboard cameras, vehicle backup cameras and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising five lens elements, the five lens elements being, in order from an object side to an image side:
   a first lens element;
   a second lens element having positive refractive power;
   a third lens element having negative refractive power;
   a fourth lens element having positive refractive power; and
   a fifth lens element with negative refractive power having an image-side surface being concave in a paraxial region thereof, wherein the image-side surface of the fifth lens element has at least one convex critical point in an off-axial region thereof, and an object-side surface and the image-side surface of the fifth lens element are both aspheric;
   wherein the total number of lens elements in the photographing optical lens system is five, an Abbe number of the first lens element is V1, an Abbe number of the second lens element is V2, an Abbe number of the third lens element is V3, an Abbe number of the fourth lens element is V4, an Abbe number of the fifth lens element is V5, a focal length of the second lens element is f2, a focal length of the third lens element is f3, a curvature radius of an object-side surface of the third lens element is R5, a curvature radius of an image-side surface of the third lens element is R6, and the following conditions are satisfied:

$30 < (V1+V2) - (V3+V4+V5) < 75$;

$-1.75 < f2/f3 < 0$; and $-2.50 < (R5+R6)/(R5-R6) < 0.40$.

2. The photographing optical lens system of claim 1, wherein a central thickness of the second lens element is CT2, a central thickness of the third lens element is CT3, and the following condition is satisfied:

$CT3/CT2 < 1.0$.

3. The photographing optical lens system of claim 2, wherein an arithmetic mean of refractive indices of the first lens element and the second lens element is Nv12, an arithmetic mean of refractive indices of the third lens element, the fourth lens element and the fifth lens element is Nv345, and the following condition is satisfied:

$-0.30 < Nv12 - Nv345 < -0.05$.

4. The photographing optical lens system of claim 1, wherein the focal length of the second lens element is f2, the focal length of the third lens element is f3, and the following condition is satisfied:

$-1.50 < f2/f3 < -0.40$.

5. The photographing optical lens system of claim 1, wherein a focal length of the photographing optical lens system is f, a focal length of the fourth lens element is f4, a focal length of the fifth lens element is f5, and the following condition is satisfied:

$3.0 < (f/f4) + |f/f5|$.

6. The photographing optical lens system of claim 1, wherein the second lens element has an object-side surface being concave in a paraxial region thereof and an image-side surface being convex in a paraxial region thereof, the fourth lens element has an object-side surface being concave in a paraxial region thereof and an image-side surface being convex in a paraxial region thereof.

7. The photographing optical lens system of claim 1, wherein the Abbe number of the fourth lens element is V4, and the following condition is satisfied:

$10 < V4 < 35$.

8. The photographing optical lens system of claim 1, wherein a curvature radius of an object-side surface of the second lens element is R3, a curvature radius of an image-side surface of the second lens element is R4, and the following condition is satisfied:

$0 \leq (R3+R4)/(R3-R4) < 2.0$.

9. The photographing optical lens system of claim 1, wherein the image-side surface of the third lens element has at least one convex critical point in an off-axial region thereof.

10. The photographing optical lens system of claim 1, wherein the curvature radius of the object-side surface of the third lens element is R5, the curvature radius of the image-side surface of the third lens element is R6, and the following condition is satisfied:

$-1.50 < (R5+R6)/(R5-R6) < 0$.

11. The photographing optical lens system of claim 1, wherein an axial distance between the first lens element and the second lens element is T12, an axial distance between the second lens element and the third lens element is T23, and the following condition is satisfied:

$2.0 < T12/T23$.

12. The photographing optical lens system of claim 1, wherein the object-side surface of the fifth lens element is convex in a paraxial region thereof.

13. The photographing optical lens system of claim 1, wherein the Abbe number of the third lens element is V3, the Abbe number of the fourth lens element is V4, the Abbe number of the fifth lens element is V5, and the following condition is satisfied:

$30 < V3+V4+V5 < 85$.

14. The photographing optical lens system of claim 1, wherein a focal length of the first lens element is f1, the focal length of the second lens element is f2, and the following condition is satisfied:

$0.60 < f1/f2 < 3.0$.

15. The photographing optical lens system of claim 1, wherein a focal length of the photographing optical lens system is f, a maximum image height of the photographing optical lens system is ImgH, and the following condition is satisfied:

$0.85 \leq ImgH/f < 2.0$.

16. An image capturing unit, comprising:
    the photographing optical lens system of claim 1; and
    an image sensor disposed on an image surface of the photographing optical lens system.

17. An electronic device, comprising:
    the image capturing unit of claim 16.

18. A photographing optical lens system comprising five lens elements, the five lens elements being, in order from an object side to an image side:

a first lens element;
a second lens element having positive refractive power;
a third lens element having negative refractive power;
a fourth lens element having positive refractive power; and
a fifth lens element with negative refractive power having an object-side surface being convex in a paraxial region thereof and an image-side surface being concave in a paraxial region thereof, wherein the image-side surface of the fifth lens element has at least one convex critical point in an off-axial region thereof, and the object-side surface and the image-side surface of the fifth lens element are both aspheric;
wherein the total number of lens elements in the photographing optical lens system is five, an Abbe number of the third lens element is V3, an Abbe number of the fourth lens element is V4, an Abbe number of the fifth lens element is V5, a focal length of the second lens element is f2, a focal length of the third lens element is f3, and the following conditions are satisfied:

$30 < V3+V4+V5 < 73.00$; and $-1.75 < f2/f3 < 0$.

19. The photographing optical lens system of claim 18, wherein the first lens element has positive refractive power and an object-side surface being convex in a paraxial region thereof.

20. The photographing optical lens system of claim 18, wherein a curvature radius of an object-side surface of the third lens element is R5, a curvature radius of an image-side surface of the third lens element is R6, and the following condition is satisfied:

$-2.50 < (R5+R6)/(R5-R6) < 0.40$.

21. The photographing optical lens system of claim 18, wherein a curvature radius of an object-side surface of the second lens element is R3, a curvature radius of an image-side surface of the second lens element is R4, and the following condition is satisfied:

$0 \leq (R3+R4)/(R3-R4) < 2.0$.

22. The photographing optical lens system of claim 18, wherein a focal length of the first lens element is f1, the focal length of the second lens element is f2, and the following condition is satisfied:

$0.60 < f1/f2 < 3.0$.

23. The photographing optical lens system of claim 18, wherein an axial distance between the first lens element and the second lens element is T12, an axial distance between the second lens element and the third lens element is T23, and the following condition is satisfied:

$2.0 < T12/T23$.

24. The photographing optical lens system of claim 18, wherein a focal length of the photographing optical lens system is f, a focal length of the fourth lens element is f4, a focal length of the fifth lens element is f5, and the following condition is satisfied:

$3.0 < (f/f4)+|f/f5|$.

25. The photographing optical lens system of claim 18, wherein the focal length of the second lens element is f2, the focal length of the third lens element is f3, and the following condition is satisfied:

$-1.50 < f2/f3 < -0.50$.

26. The photographing optical lens system of claim 18, wherein a central thickness of the second lens element is CT2, a central thickness of the third lens element is CT3, and the following condition is satisfied:

$CT3/CT2 < 1.0$.

27. The photographing optical lens system of claim 18, wherein the second lens element has an object-side surface being concave in a paraxial region thereof and an image-side surface being convex in a paraxial region thereof, the fourth lens element has an object-side surface being concave in a paraxial region thereof and an image-side surface being convex in a paraxial region thereof.

28. The photographing optical lens system of claim 18, wherein a focal length of the photographing optical lens system is f, a maximum image height of the photographing optical lens system is ImgH, and the following condition is satisfied:

$0.85 \leq ImgH/f < 2.0$.

* * * * *